US011079605B2

(12) United States Patent
Lee

(10) Patent No.: US 11,079,605 B2
(45) Date of Patent: Aug. 3, 2021

(54) TOTAL INTERNAL REFLECTION PRISM UNIT, TOTAL INTERNAL REFLECTION PRISM ASSEMBLY INCLUDING THE SAME AND APPARATUS FOR FORMING A LINE BEAM INCLUDING THE SAME

(71) Applicant: Samsung Electronics Co., Ltd., Suwon-si (KR)

(72) Inventor: Jung-Chul Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 424 days.

(21) Appl. No.: 16/029,227

(22) Filed: Jul. 6, 2018

(65) Prior Publication Data

US 2019/0146228 A1 May 16, 2019

(30) Foreign Application Priority Data

Nov. 13, 2017 (KR) .......................... 10-2017-0150751

(51) Int. Cl.
*G02B 27/09* (2006.01)
*G02B 27/00* (2006.01)
*G02B 5/04* (2006.01)

(52) U.S. Cl.
CPC ......... *G02B 27/0972* (2013.01); *G02B 5/045* (2013.01); *G02B 27/0025* (2013.01)

(58) Field of Classification Search
CPC ............ G02B 27/0972; G02B 27/0025; G02B 27/143; G02B 27/126; G02B 5/045;
(Continued)

(56) References Cited

U.S. PATENT DOCUMENTS 5,872,614 A * 2/1999 Ueno .................... A61B 3/103
351/211
6,377,410 B1 4/2002 Wang et al.
(Continued)

FOREIGN PATENT DOCUMENTS

JP 2003-103389 A 4/2003
JP 2006-301234 A 11/2006

OTHER PUBLICATIONS

Lin, et al., Design of homogeneous laser-line-beam generators, Optical Engineering 55(9), 095106, Sep. 2016.

*Primary Examiner* — Stephone B Allen
*Assistant Examiner* — Rahman Abdur
(74) *Attorney, Agent, or Firm* — Lee IP Law, P.C.

(57) ABSTRACT

A total internal reflection prism unit may include a first prism and a second prism. The first prism may include a first total reflection surface, which totally reflect slight incident in a first horizontal direction along a second horizontal direction substantially perpendicular to the first horizontal direction, and a second total reflection surface, which totally reflects the totally reflected light from the first total reflection surface along the first horizontal direction to form a first beam. The second prism may include a third total reflection surface, which totally reflects the light along a third horizontal direction substantially perpendicular to the first horizontal direction, and a fourth total reflection surface, which totally reflects the totally reflected light from the third total reflection surface along the first horizontal direction to form a second beam. The second beam may be discrete from the first beam along the third horizontal direction.

20 Claims, 26 Drawing Sheets

(58) Field of Classification Search
CPC .............. G02B 5/04; G02B 5/265; G02B 2006/12114; G02B 13/0065; G02B 13/007; G02B 27/145; G02B 27/1073; G02B 17/04; G03H 2223/18; G01N 2021/212
USPC .................................... 359/726, 831–837
See application file for complete search history.

(56) References Cited

U.S. PATENT DOCUMENTS

| | | | |
|---|---|---|---|
| 6,993,059 B2* | 1/2006 | Anikitchev | G02B 27/0977 372/100 |
| 7,006,549 B2* | 2/2006 | Anikitchev | G02B 27/09 372/107 |
| 7,307,787 B2 | 12/2007 | Furuki et al. | |
| 7,433,126 B2 | 10/2008 | Hashimoto et al. | |
| 7,782,535 B2 | 8/2010 | Mikliaev et al. | |
| 8,184,375 B2 | 5/2012 | Towndrow et al. | |
| 8,345,084 B2* | 1/2013 | Namii | G03B 35/08 348/45 |
| 9,883,788 B2* | 2/2018 | Shechterman | A61B 1/055 |
| 10,520,717 B2* | 12/2019 | Chen | G02B 5/208 |
| 2002/0172133 A1* | 11/2002 | Kim | G02B 5/04 369/112.19 |
| 2004/0075918 A1* | 4/2004 | Bendat | G02B 27/144 359/834 |
| 2006/0256562 A1* | 11/2006 | Long | G02B 27/0994 362/328 |
| 2007/0035861 A1* | 2/2007 | Kennedy | G02B 19/0057 359/834 |
| 2011/0051093 A1* | 3/2011 | Qu | G02B 27/285 353/20 |
| 2016/0209755 A1 | 7/2016 | Shmarev et al. | |
| 2016/0345805 A1* | 12/2016 | Wieters | A61B 1/00096 |
| 2017/0017037 A1 | 1/2017 | Sun et al. | |

\* cited by examiner

FIG. 2
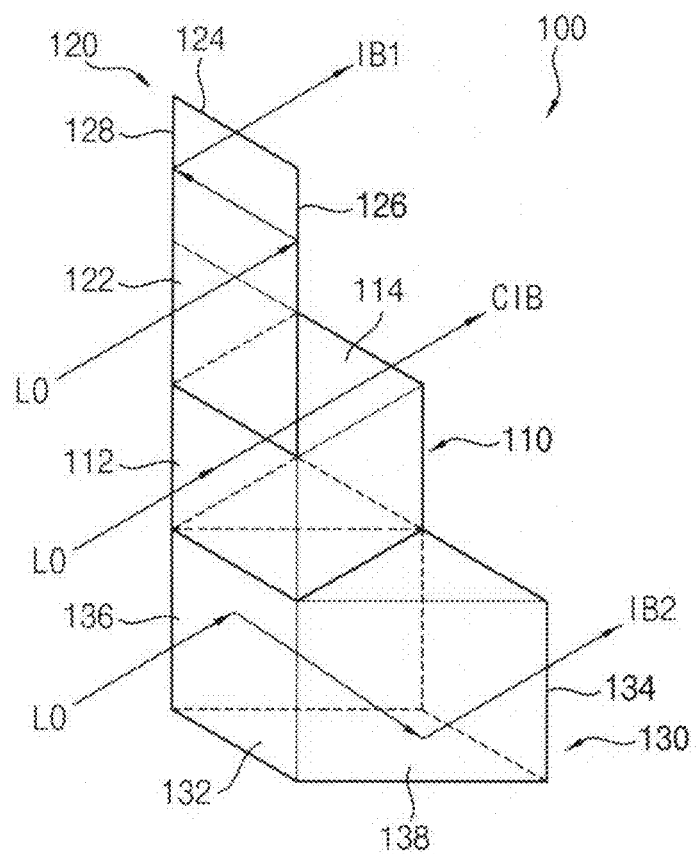
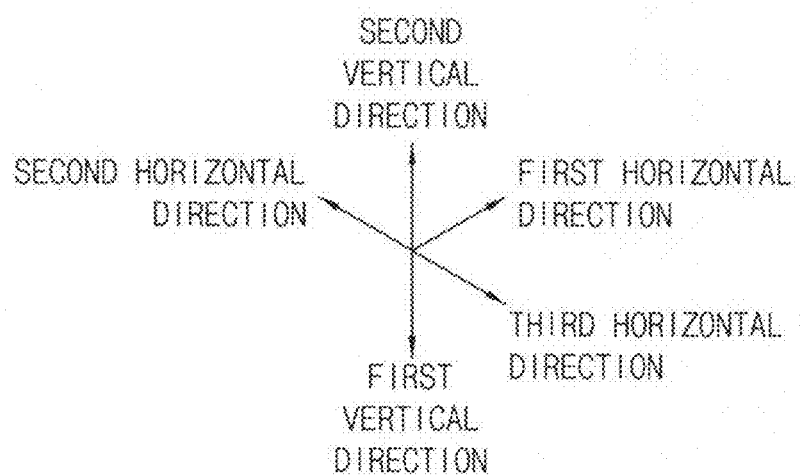

FIG. 3
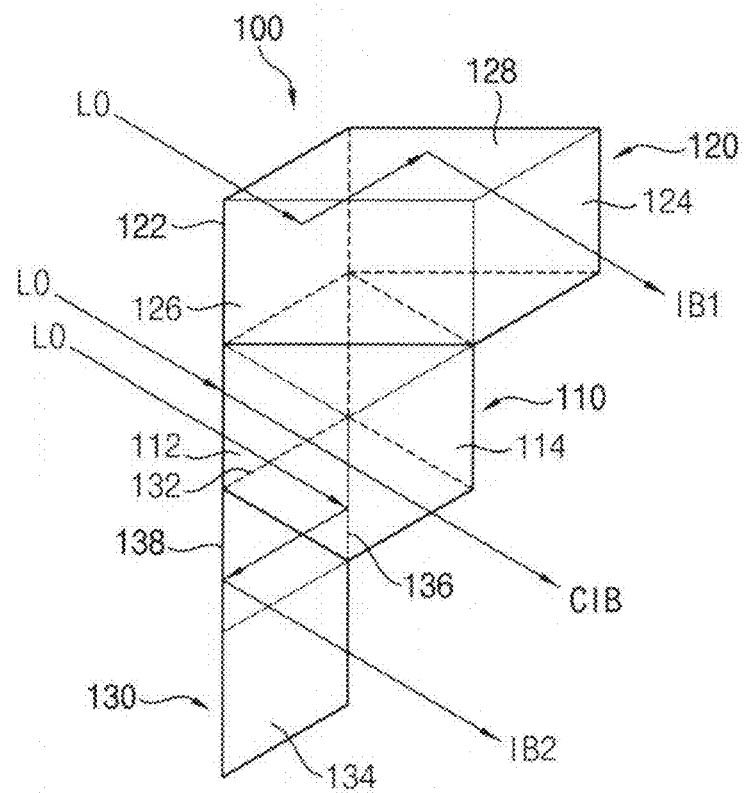
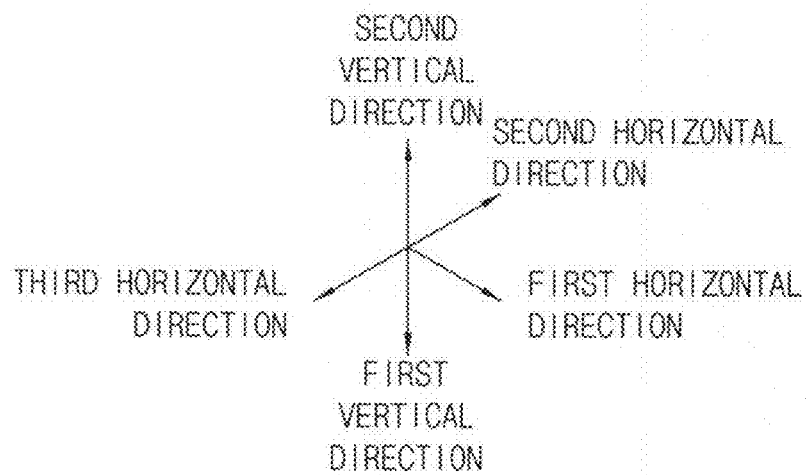

FIG. 6
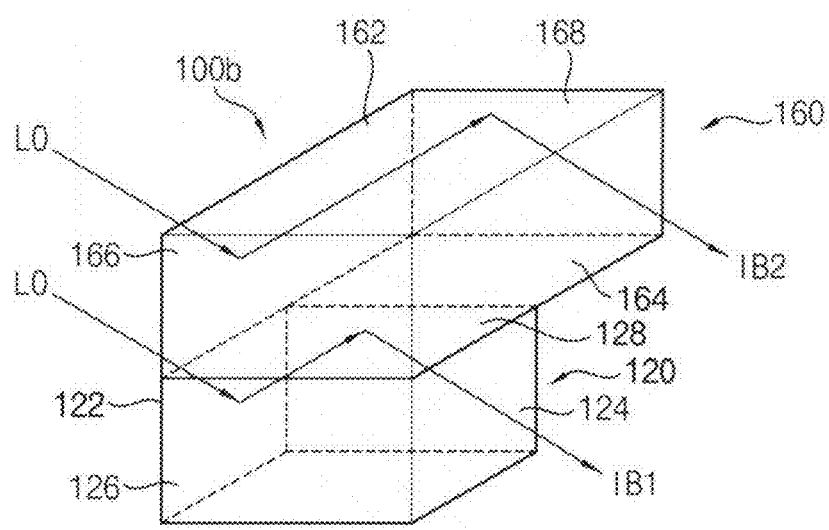
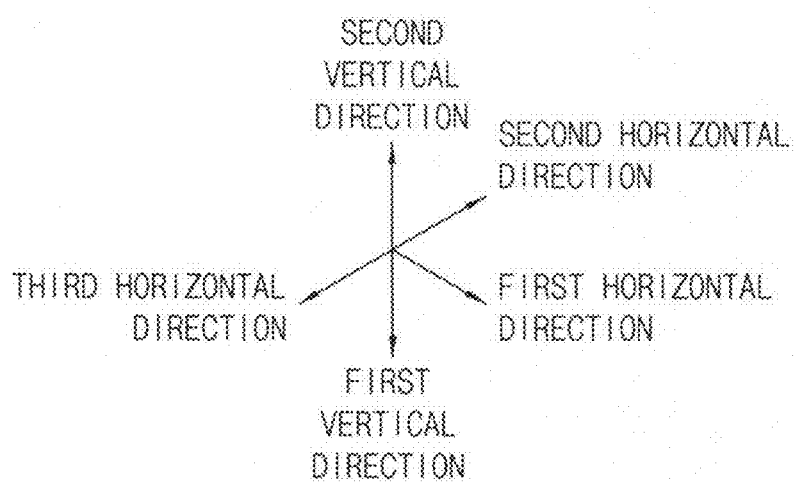

FIG. 7
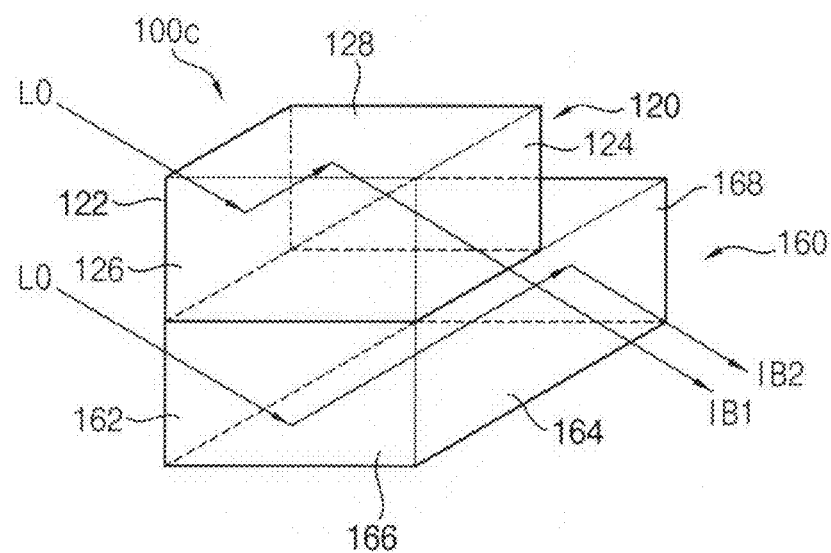
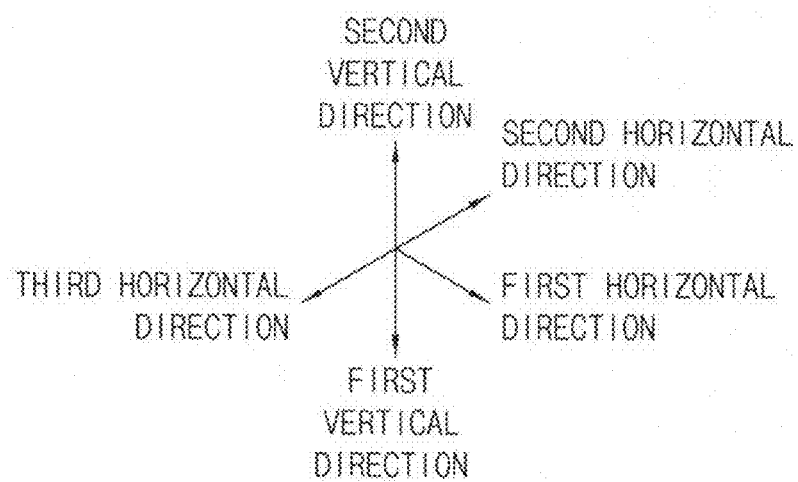

FIG. 9
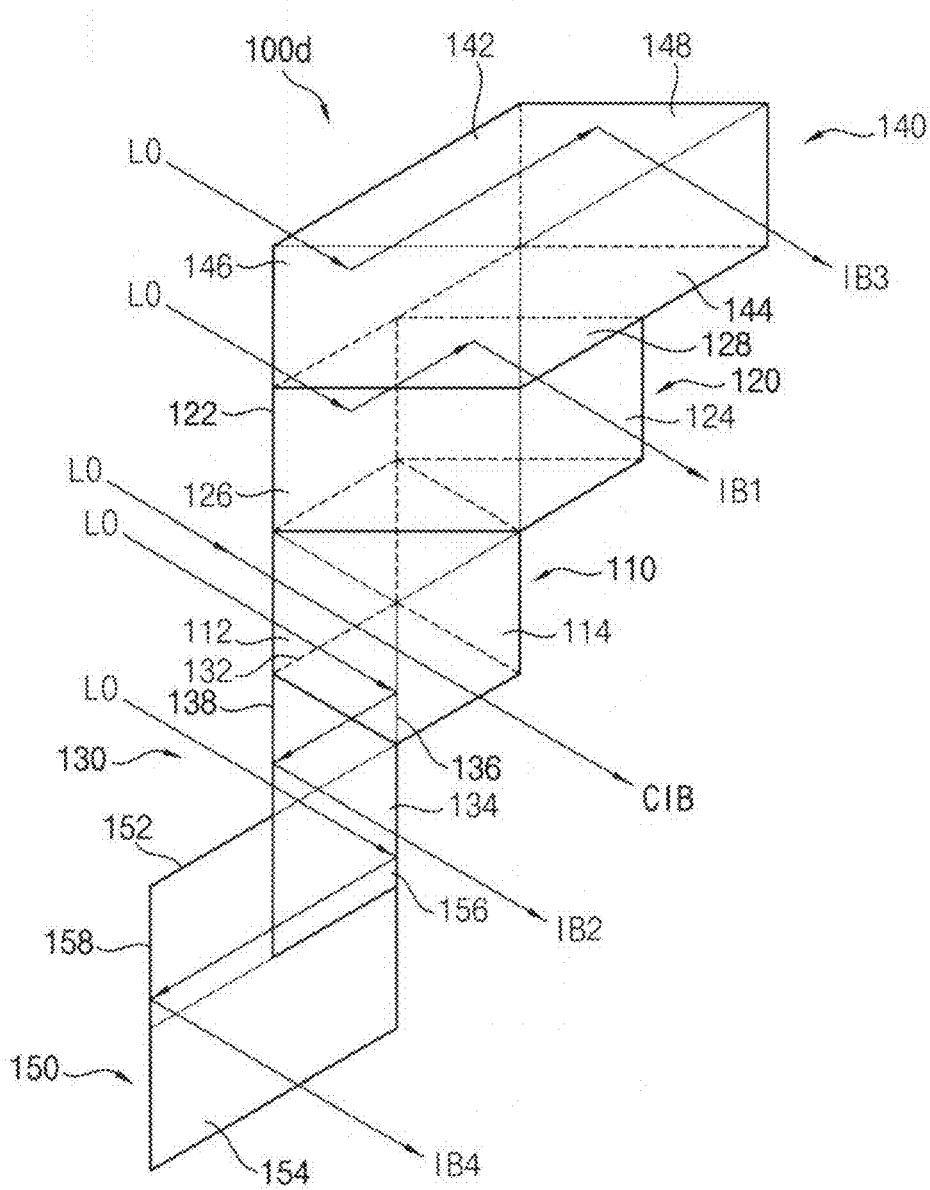
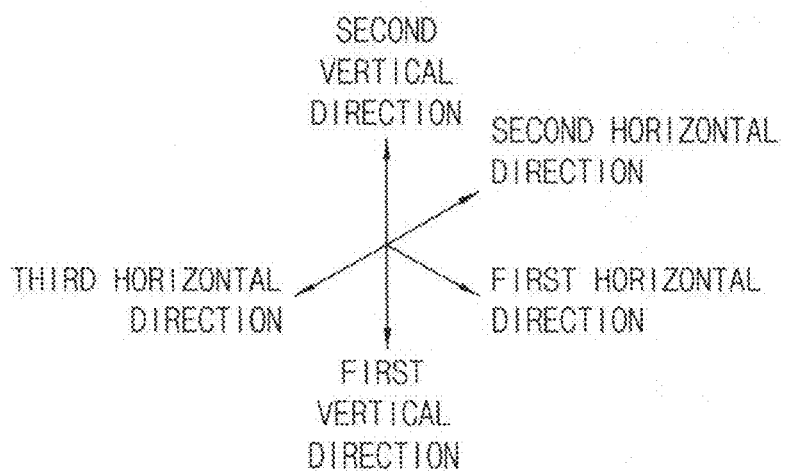

TOTAL INTERNAL REFLECTION PRISM UNIT, TOTAL INTERNAL REFLECTION PRISM ASSEMBLY INCLUDING THE SAME AND APPARATUS FOR FORMING A LINE BEAM INCLUDING THE SAME

CROSS-REFERENCE TO RELATED APPLICATION

Korean Patent Application No. 2017-0150751, filed on Nov. 13, 2017 in the Korean Intellectual Property Office (KIPO), and entitled: "Total Internal Reflection Prism Unit, Total Internal Reflection Prism Assembly Including the Same and Apparatus for Forming a Line Beam Including the Same," is incorporated by reference herein in its entirety.

BACKGROUND

1. Field

Example embodiments relate to a total internal reflection prism unit, a total internal reflection prism assembly including the same, and an apparatus for forming a line beam including the same. More particularly, example embodiments relate to a total internal reflection prism unit to redistribute light for forming a homogeneous line beam, a total internal reflection prism assembly including the total internal reflection prism unit, and an apparatus for forming a line beam including the total internal reflection prism unit.

2. Description of the Related Art

A line beam may be used for manufacturing or testing a semiconductor device.

The line beam may be formed by passing a light through an aspherical lens or a Powell lens. According to related art, homogeneity of the line beam may be determined in accordance with shapes of the aspherical lens or the Powell lens. Thus, in order to form a homogeneous line beam, the aspherical lens or the Powell lens need to be made in accordance with a designed shape.

However, when the aspherical lens or the Powell lens deviates from the designed shape, e.g., due to a process failure, the homogeneous line beam may not be properly formed. Further, the line beam may not be homogeneous due to an assembly failure of the aspherical lens or the Powell lens.

SUMMARY

According to example embodiments, there may be provided a total internal reflection prism unit. The total internal reflection prism unit may include a first prism and a second prism. The first prism may include a first total reflection surface and a second total reflection surface. The first total reflection surface may totally reflect a light incident in a first horizontal direction along a second horizontal direction substantially perpendicular to the first horizontal direction. The second total reflection surface may totally reflect the totally reflected light from the first total reflection surface along the first horizontal direction to form a first beam. The second prism may include a third total reflection surface and a fourth total reflection surface. The third total reflection surface may totally reflect the light along a third horizontal direction substantially perpendicular to the first horizontal direction. The fourth total reflection surface may totally reflect the totally reflected light from the third total reflection surface along the first horizontal direction to form a second beam. The second beam may be discrete from the first beam along the third horizontal direction.

According to example embodiments, there may be provided a total internal reflection prism assembly. The total internal reflection prism assembly may include a total reflection incidence prism unit and a total reflection exit prism unit. The total reflection incidence prism unit may include a first incidence prism and a second incidence prism. The first incidence prism may include a first total reflection incidence surface and a second total reflection incidence surface. The first total reflection incidence surface may totally reflect a light incident in a first horizontal direction along a second horizontal direction substantially perpendicular to the first horizontal direction. The second total reflection incidence surface may totally reflect the totally reflected light from the first total reflection incidence surface along the first horizontal direction to form a first incidence beam. The second incidence prism may include a third total reflection incidence surface and a fourth total reflection incidence surface. The third total reflection incidence surface may totally reflect the light along a third horizontal direction substantially perpendicular to the first horizontal direction. The fourth total reflection incidence surface may totally reflect the totally reflected light from the third total reflection incidence surface along the first horizontal direction to form a second incidence beam. The second incidence beam may be discrete from the first incidence beam along the third horizontal direction. The total reflection exit prism unit may include a first exit prism and a second exit prism. The first exit prism may include a first total reflection exit surface and a second total reflection exit surface. The first total reflection exit surface may totally reflect the first incident beam along a first vertical direction. The second total reflection exit surface may totally reflect the totally reflected beam from the first total reflection exit surface along the first horizontal direction to form a first exit beam. The second exit prism may include a third total reflection exit surface and a fourth total reflection exit surface. The third total reflection exit surface may totally reflect the second incidence beam along a second vertical direction. The fourth total reflection exit surface may totally reflect the totally reflected beam from the third total reflection exit surface along the first horizontal direction to form a second exit beam. The second exit beam may be discrete from the first exit beam along the third horizontal direction.

According to example embodiments, there may be provided an apparatus for forming a line beam. The apparatus may include a total reflection incidence prism unit, a total reflection exit prism unit and a condensing lens unit. The total reflection incidence prism unit may include a first incidence prism and a second incidence prism. The first incidence prism may include a first total reflection incidence surface and a second total reflection incidence surface. The first total reflection incidence surface may totally reflect a light incident in a first horizontal direction along a second horizontal direction substantially perpendicular to the first horizontal direction. The second total reflection incidence surface may totally reflect the totally reflected light from the first total reflection incidence surface along the first horizontal direction to form a first incidence beam. The second incidence prism may include a third total reflection incidence surface and a fourth total reflection incidence surface. The third total reflection incidence surface may totally reflect the light along a third horizontal direction substantially perpendicular to the first horizontal direction. The fourth total reflection incidence surface may totally reflect the totally reflected light from the third total reflection incidence surface along the first horizontal direction to form a second incidence beam. The second incidence beam may be discrete from the first incidence beam along the third horizontal direction. The total reflection exit prism unit may include a first exit prism and a second exit prism. The first exit prism may include a first total reflection exit surface and a second total reflection exit surface. The first total reflection exit surface may totally reflect the first incident beam along a first vertical direction. The second total reflection exit surface may totally reflect the totally reflected beam from the first total reflection exit surface along the first horizontal direction to form a first exit beam. The second exit prism may include a third total reflection exit surface and a fourth total reflection exit surface. The third total reflection exit surface may totally reflect the second incidence beam along a second vertical direction. The fourth total reflection exit surface may totally reflect the totally reflected beam from the third total reflection exit surface along the first horizontal direction to form a second exit beam. The second exit beam may be discrete from the first exit beam along the third horizontal direction. The condensing lens unit may condense the first and second exit beams from the total reflection exit prism unit along the second and third horizontal directions to form the line beam.

BRIEF DESCRIPTION OF THE DRAWINGS

Features will become apparent to those of skill in the art by describing in detail exemplary embodiments with reference to the attached drawings in which:

FIG. 2 illustrates a perspective view of the total internal reflection prism unit in FIG. 1 viewed from an incidence direction;

FIG. 3 illustrates a perspective view of the total internal reflection prism unit in FIG. 2 viewed from an exit direction;

FIG. 6 illustrates a perspective view of a total internal reflection prism unit in accordance with example embodiments;

FIG. 7 illustrates a perspective view of a total internal reflection prism unit in accordance with example embodiments;

FIG. 9 illustrates a perspective view of the total internal reflection prism unit in FIG. 8 viewed from an exit direction;

DETAILED DESCRIPTION

Hereinafter, example embodiments will be explained in detail with reference to the accompanying drawings.

Total Internal Reflection Prism Unit

Figure 1:
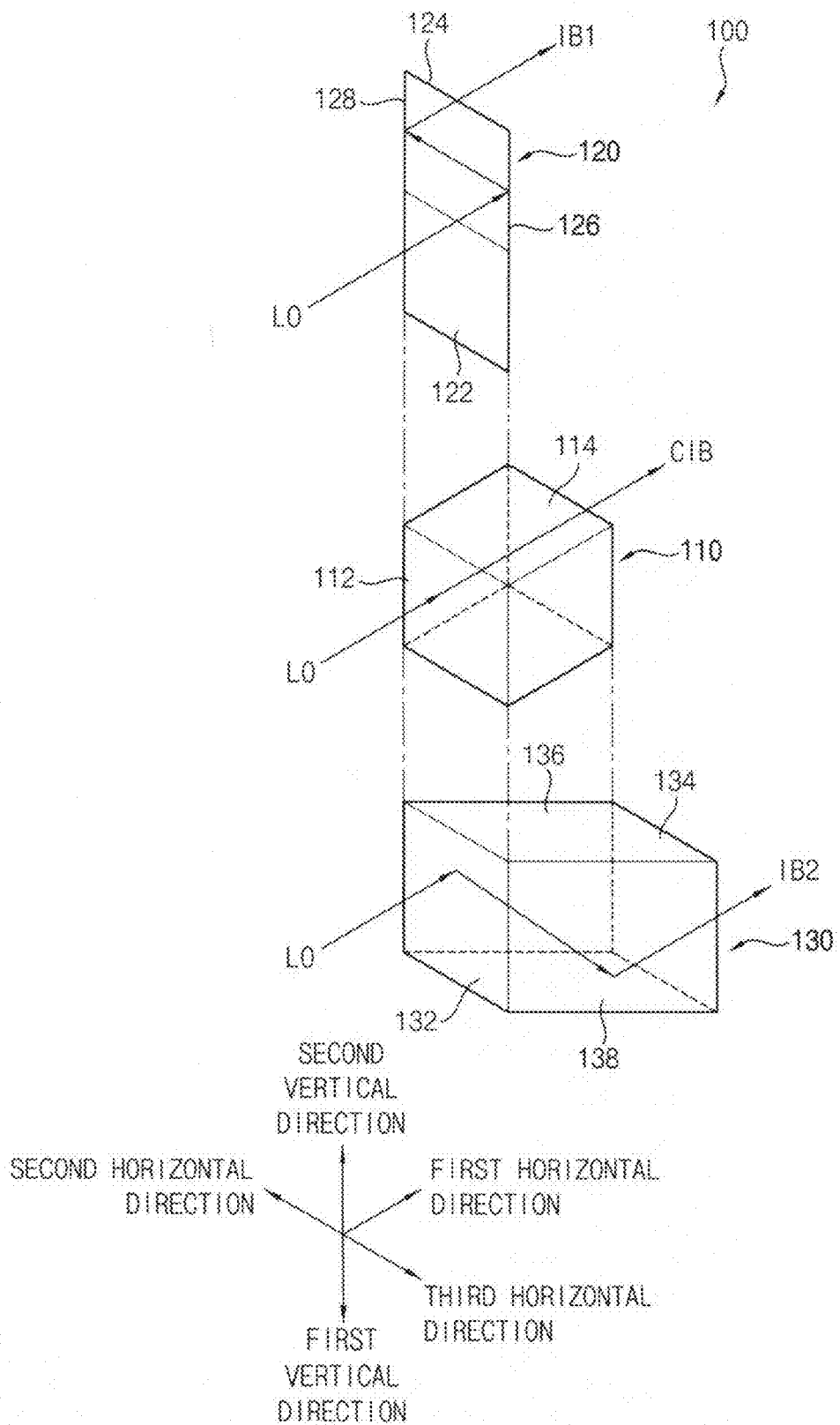
FIG. 1 illustrates an exploded perspective view of a total internal reflection prism unit viewed from an incidence direction in accordance with example embodiments.
Figure 4:
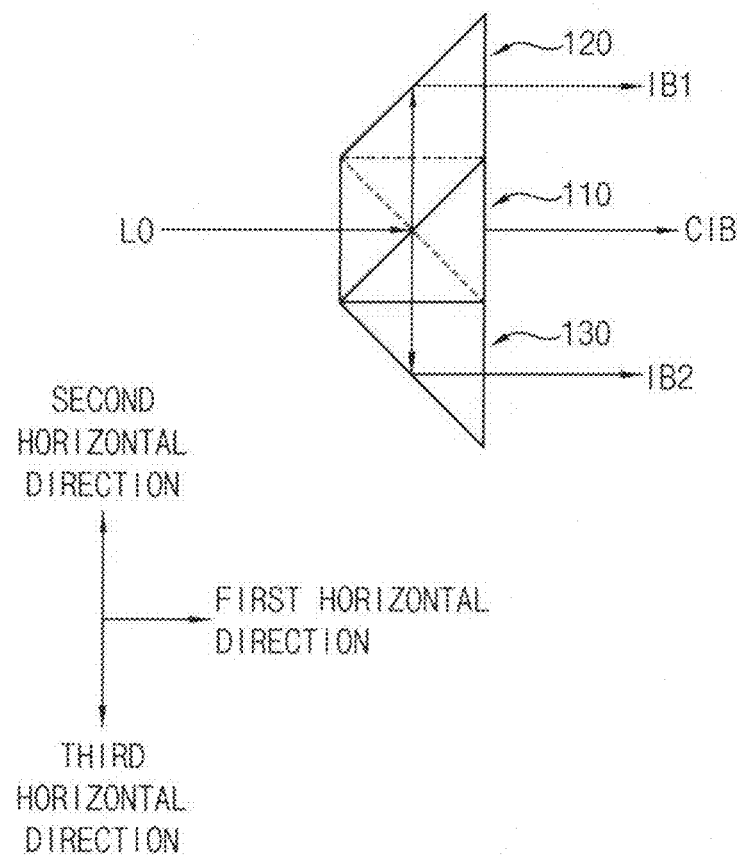
FIG. 4 illustrates a plan view of the total internal reflection prism unit in FIG. 2.

FIG. 1 is an exploded perspective view illustrating a total internal reflection prism unit viewed from an incidence direction in accordance with example embodiments. FIG. 2 is a perspective view illustrating the total internal reflection prism unit in FIG. 1. FIG. 3 is a perspective view illustrating the total internal reflection prism unit in FIG. 2 viewed from an exit direction. FIG. 4 is a plan view illustrating the total internal reflection prism unit in FIG. 2.

Referring to FIGS. 1 to 4, a total internal reflection prism unit 100 of this example embodiment may include a central prism 110, a first prism 120 and a second prism 130. In FIGS. 1 and 2, a front view of the first prism 120 is shown and, in FIG. 3, a back view of the second prism 130 is shown.

The central prism 110 may have a cube shape. Thus, the central prism 110 may have six equal surfaces, i.e., four side surfaces, an upper surface, and a lower surface. Any one of the four side surface may be substantially perpendicular to a first direction in which a light L0 may be incident. Therefore, the side surface of the central prism 110 to which the light L0 may be incident may correspond to an incidence surface 112 of the central prism 110.

A side surface, which may be substantially parallel to the incidence surface 112, among the three side surfaces except for the incidence surface 112 may correspond to an exit surface 114 of the central prism 110 through which the light L0 passing through the incidence surface 112 may exit. The remaining two side surfaces among the four side surface except for the incidence surface 112 and the exit surface 114 may be substantially perpendicular to the incidence surface 112 and the exit surface 114, and parallel to each other.

Because the incidence surface 112 of the central prism 110 is substantially perpendicular to the first horizontal direction, i.e., the incident direction of the light L0, the light L0 may not be refracted from the incidence surface 112 of the central prism 110, i.e., may not experience a change in direction, but may experience a change in speed. The light L0 may pass through the incidence surface 112 of the central prism 110. Thus, a progressing direction of the light L0 passing through the incidence surface 112 of the central prism 110 may correspond to the first horizontal direction. Because the two side surfaces among the four side surfaces except for the incidence surface 112 and the exit surface 114 may be substantially perpendicular to the incidence surface 112 and the exit surface 114, the light L0 passing through the incidence surface 112 may not be refracted from the two side surfaces.

Because the exit surface 114 of the central prism 110 may also be substantially perpendicular to the first horizontal direction corresponding to the incident direction of the light L0, the light L0 may not be refracted from the exit surface 114 of the central prism 110. The light L0 may pass through the exit surface 114 of the central prism 110. Thus, a central beam CIB may exit from the exit surface 114 of the central prism 110 in the first horizontal direction.

The first prism 120 may be arranged over the central prism 110, e.g., above the central prism along the second vertical direction. The first prism 120 may have a parallelepiped shape. Thus, the first prism 120 may have two long side surfaces substantially parallel to each other, two short side surfaces substantially parallel to each other, an upper surface, and a lower surface.

The light L0 may be incident on either one of the two short side surfaces of the first prism 120. A first short side surface on which the light L0 is incident may correspond to an incidence surface 122 of the first prism 120. The incidence surface 122 of the first prism 120 may be substantially perpendicular to the first horizontal direction. Thus, the light L0 incident in the first horizontal direction may not be refracted from the incidence surface 122 of the first prism 120. The light L0 may pass through the incidence surface 122 of the first prism 120. The incidence surface 122 of the first prism 120 may be substantially coplanar with the incidence surface 112 of the central prism 110. Particularly, the incidence surface 122 of the first prism 120 may be arranged vertically over the incidence surface 112 of the central prism 110, e.g., aligned therewith along the second vertical direction. Further, the incidence surface 122 of the first prism 120 may have a size substantially the same as that of the incidence surface 112 of the central prism 110.

Alternatively, the incidence surface 122 of the first prism 120 may be on a plane different from that of the incidence surface 112 of the central prism 110. Further, the incidence surface 122 of the first prism 120 may have a size different from that of the incidence surface 112 of the central prism 110.

A second short side surface of the first prism 120 may correspond to an exit surface 124 of the first prism 120. The exit surface 124 of the first prism 120 may be substantially perpendicular to the first horizontal direction. Thus, the light L0 may not be refracted from the exit surface 124 of the first prism 120. The light L0 may pass through the exit surface 124 of the first prism 120. The exit surface 124 of the first prism 120 may be coplanar with the exit surface 114 of the central prism 110. Particularly, the exit surface 124 of the first prism 120 may be spaced from the exit surface 114 of the central prism 110 along a second horizontal direction substantially perpendicular to the first horizontal direction. Further, the exit surface 124 of the first prism 120 may have a size substantially the same as that of the exit surface 114 of the central prism 110.

Alternatively, the exit surface 124 of the first prism 120 may be on a plane different from a plane than the incidence surface 112 of the central prism 110. Further, the exit surface 124 of the first prism 120 may have a size different from that of the incidence surface 112 of the central prism 110.

The long side surfaces of the first prism 120 may be inclined to the incidence surface 122 and the exit surface 124 of the first prism 120 at an acute angle. Particularly, the acute angle between the long side surfaces and the incidence and exit surfaces 122 and 124 of the first prism 120 may correspond to a critical angle at which the light L0 may be totally reflected with respect to the first horizontal direction. Thus, the acute angle may be about 45°. The long side surfaces of the first prism 120 that totally reflect the light L0 may correspond to a first total reflection surface 126 and a second total reflection surface 128 of the first prism 120.

The first total reflection surface 126 of the first prism 120 may be inclined to the side surface of the central prism 110 at the angle of about 45° along a clockwise direction. The first total reflection surface 126 of the first prism 120 may totally reflect the light L0 incident in the first horizontal direction along the second horizontal direction. Thus, the light L0 passing through the incidence surface 122 of the first prism 120 may be totally reflected from the first total reflection surface 126 of the first prism 120. The totally reflected light L0 may be incident on the second total reflection surface 128 in the second horizontal direction. The first total reflection surface 126 of the first prism 120 may have a length substantially the same as a diagonal length of the central prism 110. Alternatively, the first total reflection surface 126 of the first prism 120 may have a length different from the diagonal length of the central prism 110.

The second total reflection surface 128 of the first prism 120 may be substantially parallel to the first total reflection surface 126 of the first prism 120. The second total reflection surface 128 of the first prism 120 may be inclined to the side surface of the central prism 110 at the angle of about 45° along a counter clockwise direction. The second total reflection surface 128 of the first prism 120 may totally reflect the totally reflected light L0 from the first total reflection surface 126 of the first prism 120 along the first horizontal direction. Thus, the totally reflected light L0 from the second total reflection surface 128 of the first prism 120 may be incident on the exit surface 124 of the first prism 120. A first beam IB1 may exit from the exit surface 124 of the first prism 120. The second total reflection surface 128 of the first prism 120 may have a length substantially the same as the diagonal length of the central prism 110. Alternatively, the second total reflection surface 128 of the first prism 120 may have a length different from the diagonal length of the central prism 110.

Because the exit surface 124 of the first prism 120 is spaced apart from the exit surface 114 of the central prism 110 in the second horizontal direction, the first beam IB1 may not be on a vertical line as that on which the central beam CIB is positioned on an image plane. Further, the first beam IB1 may be discrete, e.g., separate and distinct, from the central beam CIB in the second horizontal direction. Thus, the first beam IB1 and the central beam CIB may not overlap each other.

The lower surface of the first prism 120 may make contact with the upper surface of the central prism 110. Thus, the light L0 may not pass between the central prism 110 and the first prism 120.

Further, the first prism 120 may have a thickness along the second vertical direction substantially the same as that of the central prism 110. When the thickness of the first prism 120 is different from that of the central prism 110, a height difference between the first beam IB1 and the central beam CIB may be generated in an apparatus for forming a line beam, discussed later, that may redistribute and condense the first beam IB1 and the central beam CIB, so that the line beam may not be homogeneous.

The total reflection functions of the first prism 120 may be achieved by accurately arranging the first prism 120 with respect to the first horizontal direction, i.e., the incident direction of the light L0. That is, the incidence surface 122 and the exit surface 124 of the first prism 120 may be arranged perpendicular to the first horizontal direction. Further, the first total reflection surface 126 and the second total reflection surface 128 of the first prism 120 may be inclined to the first horizontal direction at the angle of about 45°.

As mentioned above, the first prism 120 may have the parallelepiped shape. Further, the incidence surface 122 of the first prism 120 may have the size substantially the same as the size of the incidence surface 112 of the central prism 110. Furthermore, the length of the first and second total reflection surfaces 126 and 128 of the first prism 120 may be substantially the same as the diagonal length of the central prism 110. Thus, when both lower corners of the incidence surface 122 of the first prism 110 are aligned with both upper corners of the incidence surface 112 of the central prism 110, a left lower corner of the exit surface 124 of the first prism 120 may be accurately aligned with the right upper corner of the exit surface 114 of the central prism 110. As a result, by simply arranging the first prism 120 on the upper surface of the central prism 110, the incidence surface 122 and the exit surface 124 of the first prism 120 may be accurately perpendicular to the first horizontal direction and the first and second total reflection surfaces 126 and 128 of the first prism 120 may be accurately inclined to the first horizontal direction at the angle of about 45°.

The second prism 130 may be arranged under the central prism 110 along the first vertical direction. The second prism 130 may have a parallelepiped shape. Thus, the second prism 130 may have two long side surfaces substantially parallel to each other, two short side surfaces substantially parallel to each other, an upper surface, and a lower surface. The second prism 130 may have a shape substantially the same as that of the first prism 120. Thus, the second prism 130 may have a thickness substantially the same as that of the first prism 120. Alternatively, the second prism 130 may have a shape and/or thickness different from that of the first prism 120.

The light L0 may be incident on any one of the two short side surfaces of the second prism 130. The side surface to which the light L0 may be incident may correspond to an incidence surface 132 of the second prism 130. The incidence surface 132 of the second prism 130 may be substantially perpendicular to the first horizontal direction. Thus, the light L0 incident in the first horizontal direction may not be refracted from the incidence surface 132 of the second prism 130. The light L0 may pass through the incidence surface 132 of the second prism 130. The incidence surface 132 of the second prism 130 may be substantially coplanar with the incidence surface 112 of the central prism 110. Therefore, the incidence surface 132 of the second prism 130 may be substantially coplanar with the incidence surface 122 of the first prism 120. Particularly, the incidence surface 132 of the second prism 130 may be arranged vertically under the incidence surface 112 of the central prism 110. Further, the incidence surface 132 of the second prism 130 may have a size substantially the same as that of the incidence surface 112 of the central prism 110. Thus, the size of the incidence surface 132 of the second prism 130 may be substantially the same as the size of the incidence surface 122 of the first prism 120.

Alternatively, the incidence surface 132 of the second prism 130 may be positioned on a plane different from that on which the incidence surface 112 of the central prism 110. Further, the incidence surface 132 of the second prism 130 may have a size different from that of the incidence surface 112 of the central prism 110.

The other short side surface of the second prism 130 may correspond to an exit surface 134 of the second prism 130. The exit surface 134 of the second prism 130 may be substantially perpendicular to the first horizontal direction. Thus, the light L0 may not be refracted from the exit surface 134 of the second prism 130. The light L0 may pass through the exit surface 134 of the second prism 130. The exit surface 134 of the second prism 130 may be coplanar with the exit surface 114 of the central prism 110. Therefore, the exit surface 134 of the second prism 130 may be substantially coplanar with the exit surface 124 of the first prism 120. Particularly, the exit surface 134 of the second prism 130 may be discrete from the exit surface 114 of the central prism 110 along a third horizontal direction opposite to the second horizontal direction. Further, the exit surface 134 of the second prism 130 may have a size substantially the same as that of the exit surface 114 of the central prism 110. Thus, the size of the exit surface 134 of the second prism 130 may be substantially the same as the size of the exit surface 124 of the first prism 120.

Alternatively, the exit surface 134 of the second prism 130 may be on a plane different from that of the incidence surface 112 of the central prism 110. Further, the exit surface 134 of the second prism 130 may have a size different from that of the incidence surface 112 of the central prism 110.

The long side surfaces of the second prism 130 may be inclined to the incidence surface 132 and the exit surface 134 of the second prism 130 at an acute angle. Particularly, the acute angle between the long side surfaces and the incidence and exit surfaces 132 and 134 of the second prism 130 may correspond to a critical angle at which the light L0 may be totally reflected with respect to the first horizontal direction. Thus, the acute angle may be about 45°. The long side surfaces of the second prism 130 to totally reflect the light L0 may correspond to a third total reflection surface 136 and a fourth total reflection surface 138 of the second prism 130.

The third total reflection surface 136 of the second prism 130 may be inclined to the side surface of the central prism 110 at the angle of about 45° along a counter clockwise direction. The first total reflection surface 136 of the second prism 130 may totally reflect the light L0 incident in the first horizontal direction along the third horizontal direction substantially perpendicular to the first horizontal direction. Thus, the light L0 passing through the incidence surface 132 of the second prism 130 may be totally reflected from the third total reflection surface 136 of the second prism 130. The totally reflected light L0 may be incident on the fourth total reflection surface 138 in the third horizontal direction. The third total reflection surface 136 of the second prism 130 may have a length substantially the same as a diagonal length of the central prism 110. Alternatively, the third total reflection surface 136 of the second prism 130 may have a length different from the diagonal length of the central prism 110.

The fourth total reflection surface 138 of the second prism 130 may be substantially parallel to the third total reflection surface 136 of the second prism 130. The fourth total reflection surface 138 of the second prism 130 may be inclined to the side surface of the central prism 110 at the angle of about 45° along the clockwise direction. The fourth total reflection surface 138 of the second prism 130 may totally reflect the totally reflected light L0 from the third total reflection surface 136 of the second prism 130 along the first horizontal direction. Thus, the totally reflected light L0 from the fourth total reflection surface 138 of the second prism 130 may be incident on the exit surface 134 of the second prism 130. A second beam IB2 may exit from the exit surface 134 of the second prism 130. The fourth total reflection surface 138 of the second prism 130 may have a length substantially the same as the diagonal length of the central prism 110. Alternatively, the fourth total reflection surface 138 of the second prism 130 may have a length different from the diagonal length of the central prism 110.

Because the exit surface 134 of the second prism 130 may be spaced from the exit surface 114 of the central prism 110 in the third horizontal direction, the second beam IB2 may not be on a vertical line as that of the central beam CIB. Further, the second beam IB2 may be discrete, e.g., separate and distinct, from the central beam CIB in the third horizontal direction. Thus, the second beam IB2 and the central beam CIB may not overlap each other on the same vertical line. Further, as the discrete direction of the exit surface 134 of the second prism 130 is opposite to the discrete direction of the exit surface 124 of the first prism 120, the second beam IB2 and the first beam IB1 may also not overlap (see FIG. 30).

The upper surface of the second prism 130 may make contact with the lower surface of the central prism 110. Thus, the light L0 may not pass through between the central prism 110 and the second prism 130.

The total reflection functions of the second prism 130 may be achieved by accurately arranging the second prism 130 with respect to the first horizontal direction, i.e., the incident direction of the light L0. That is, the incidence surface 132 and the exit surface 134 of the second prism 130 may be arranged perpendicular to the first horizontal direction. Further, the third total reflection surface 136 and the fourth total reflection surface 138 of the second prism 130 may be inclined to the first horizontal direction at the angle of about 45°.

As mentioned above, the second prism 130 may have the parallelepiped shape substantially the same as that of the first prism 120. Further, the incidence surface 132 of the second prism 130 may have the size substantially the same as the size of the incidence surface 112 of the central prism 110. Furthermore, the length of the third and fourth total reflection surfaces 136 and 138 of the second prism 130 may be substantially the same as the diagonal length of the central prism 110. Thus, when both upper corners of the incidence surface 132 of the second prism 130 are aligned with both lower corners of the incidence surface 112 of the central prism 110, a right upper corner of the exit surface 134 of the second prism 130 may be accurately aligned with the left lower corner of the exit surface 114 of the central prism 110.

In particular, the first prism 120, the central prism 110, and the second prism 130 may be stacked on each other along the second vertical direction, with each of the first prism 120 and the second prism 130 overlapping different portions of the central prism 110. For example, the central prism 110 may overlap a triangular area of each of the first and second prisms 120, 130, with a remaining triangular area of each of the first and second prisms 120, 130 protruding away from the central prism 110 in different horizontal directions (see FIG. 4). As a result, by simply arranging the second prism 130 on the lower surface of the central prism 110, the incidence surface 132 and the exit surface 134 of the second prism 130 may be accurately perpendicular to the first horizontal direction and the third and fourth total reflection surfaces 136 and 138 of the second prism 130 may be accurately inclined to the first horizontal direction at the angle of about 45°.

Further, because the central prism 110, the first prism 120 and the second prism 130 may have the same thickness, a height difference between the first beam IB1, the second beam IB2 and the central beam CIB may not be generated during the apparatus for forming the line beam illustrated later may redistribute and condense the first beam IB1, the second beam IB2, and the central beam CIB so that the line beam may be homogeneous.

FIGS. 1 to 3 show that three light beams L0 are incident on the incidence surface 112 of the central prism 110, the incidence surface 122 of the first prism 120, and the incidence surface 132 of the second prism 130, respectively, for convenience of explanation. However, as shown in FIG. 4, a single light beam light L0 may be incident on the incidence surface 112 of the central prism 110, the incidence surface 122 of the first prism 120, and the incidence surface 132 of the second prism 130.

According to example embodiments, the first prism and the second prism may totally reflect the light along the opposite horizontal directions to redistribute the light into the three beams horizontally discrete, e.g., separate and distinct, from each other.

Figure 5:
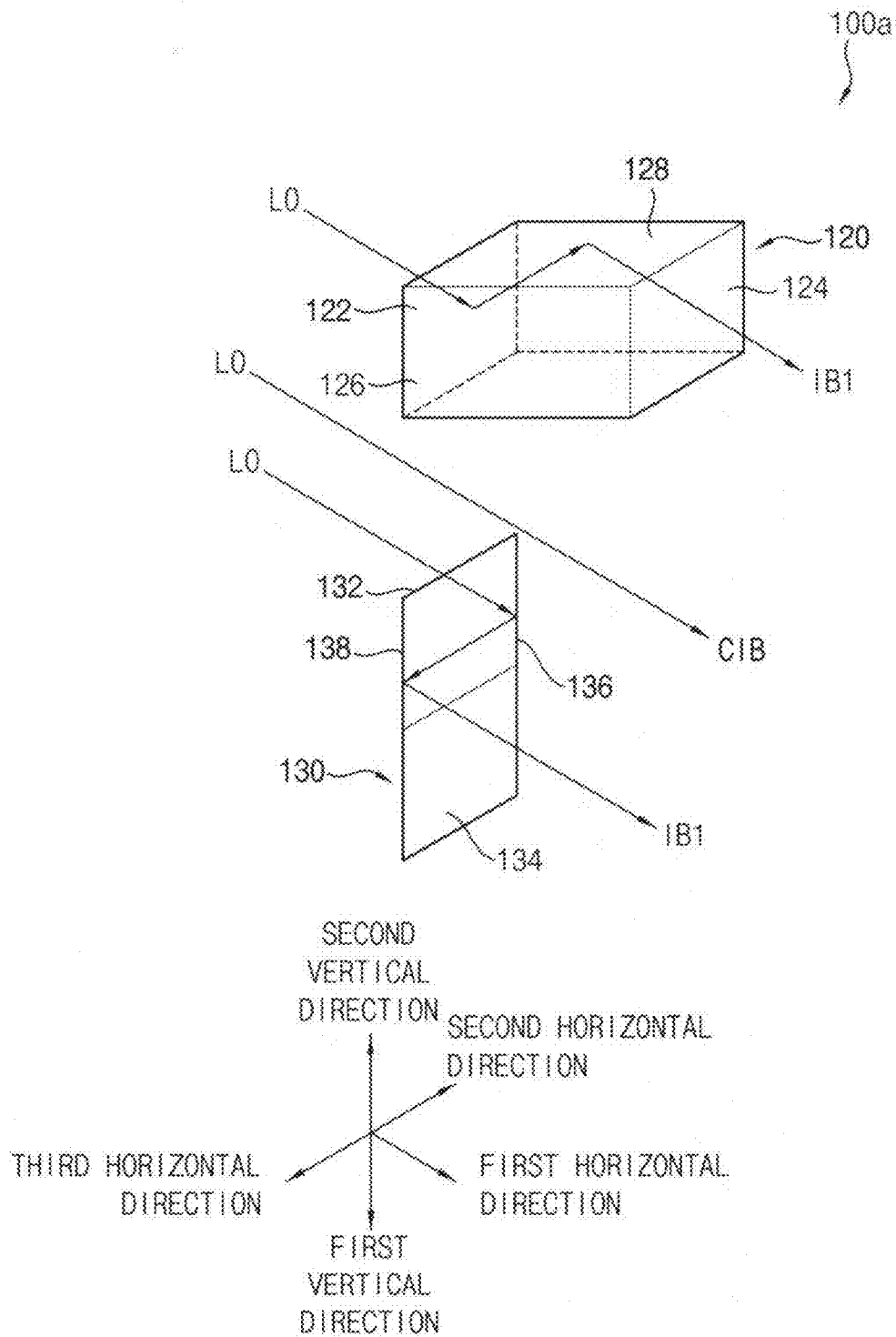
FIG. 5 illustrates a perspective view of a total internal reflection prism unit in accordance with example embodiments.

FIG. 5 is a perspective view illustrating a total internal reflection prism unit in accordance with example embodiments. Referring to FIG. 5, a total internal reflection prism unit 100a of this example embodiment may include the first prism 120 and the second prism 130. That is, the total internal reflection prism unit 100a may not include the central prism 110 in FIG. 1.

The central prism may not refract the light L0. Thus, the light L0 may pass through the central prism. Therefore, the central prism may not have a function for changing a path of the light L0. The central prism may function as an arranging position of the first and second prisms 120 and 130. Thus, the central prism may not be arranged between the first prism 120 and the second prism 130.

The functions of the first and second prisms 120 and 130 may be illustrated with reference to FIGS. 1 to 4. Thus, any further illustrations with respect to the first and second prisms 120 and 130 may be omitted herein for brevity.

FIG. 6 is a perspective view illustrating a total internal reflection prism unit in accordance with example embodiments. Referring to FIG. 6, a total internal reflection prism unit 100b of this example embodiment may include the first prism 120 and a second prism 160.

The first prism 120 may have a parallelepiped shape. The first prism 120 of this example embodiment may have a shape substantially the same as that of the first prism 120 in FIG. 3. Thus, the same reference numerals may refer to the same elements and any further illustrations with respect to the same elements of the first prism 120 may be omitted herein for brevity.

The second prism 160 may be arranged over the first prism 120. The second prism 160 may have a parallelepiped shape. Thus, the second prism 160 may have two long side surfaces substantially parallel to each other, two short side surfaces substantially parallel to each other, an upper surface, and a lower surface.

The second prism 160 may have a thickness substantially the same as that of the first prism 120. The second prism 160 may have a width measured in the first horizontal direction substantially the same as that of the first prism 120.

In contrast, the second prism 160 may have a length measured in the second horizontal direction longer than that of the first prism 120. In example embodiments, the length of the second prism 160 may be about twice the length of the first prism 120, but is not limited thereto. When the length of the second prism 160 is twice the length of the first prism 120, the second prism 160 may have a shape in which the two first prisms 120 may be serially arranged along the second horizontal direction. The lower surface of the second prism 160 may make contact with the upper surface of the first prism 120.

The second prism 160 may have an incidence surface 162 substantially coplanar with the incidence surface 122 of the first prism 120. The incidence surface 162 of the second prism 160 may be substantially perpendicular to the first horizontal direction. Thus, the light L0 incident in the first horizontal direction may pass through, not be refracted from, the incidence surface 162 of the second prism 160.

In example embodiments, because the length of the second prism 160 may twice that of the first prism 120, the incidence surface 162 of the second prism 160 may be twice that of the incidence surface 122 of the first prism 120. Thus, a right half portion of the incidence surface 162 of the second prism 160 may protrude from the incidence surface 122 of the first prism 120 along the second horizontal direction.

The second prism 160 may have an exit surface 164 opposite to the incidence surface 162. The exit surface 164 of the second prism 160 may be substantially coplanar with the exit surface 124 of the first prism 120. The exit surface 164 of the second prism 160 may be substantially perpendicular to the first horizontal direction.

In example embodiments, because the length of the second prism 160 may be twice the length of the first prism 120, the exit surface 164 of the second prism 160 may be twice the size of the exit surface 124 of the first prism 120. Thus, a right half portion of the exit surface 164 of the second prism 160 may protrude from the exit surface 124 of the first prism 120 along the second horizontal direction. That is, the exit surface 164 of the second prism 160 may be separate from the exit surface 124 of the first prism 120 along the second horizontal direction.

The second prism 160 may have a third total reflection surface 166 substantially parallel to the first total reflection surface 126 of the first prism 120. Particularly, the third total reflection surface 166 of the second prism 160 may be substantially coplanar with the first total reflection surface 126 of the first prism 120. The third total reflection surface 166 of the second prism 160 may totally reflect the light L0 incident in the first direction along the second horizontal direction. Thus, the light L0 passing through the incidence surface 162 of the second prism 160 may be totally reflected from the third total reflection surface 166 of the second prism 160. The totally reflected light L0 from the third total reflection surface 166 may be incident on a fourth total reflection surface 168 of the second prism 160 along the second horizontal direction.

The fourth total reflection surface 168 of the second prism 160 may be substantially parallel to the third total reflection surface 166 of the second prism 160. Thus, the fourth total reflection surface 168 of the second prism 160 may also be substantially perpendicular to the second total reflection surface 128 of the first prism 120. In example embodiments, because the length of the second prism 160 may be two times the length of the first prism 120, the fourth total reflection surface 168 of the second prism 160 may be discrete from the second total reflection surface 128 of the first prism 120 along the second horizontal direction. The fourth total reflection surface 168 of the second prism 160 may totally reflect the totally reflected light L0 from the third total reflection surface 166 along the first horizontal direction. Thus, a second beam IB2 may exit from the exit surface 164 of the second prism 160.

Because the exit surface 164 of the second prism 160 is separate from the exit surface 124 of the first prism 120 in the second horizontal direction, the second beam IB2 may not be positioned on a vertical line as that of the first beam IB1. Further, the second beam 1132 may be discrete from the first beam IB1 in the second horizontal direction. Thus, the second beam IB2 and the first beam IB1 may not overlap each other, e.g., the first beam IB1 and the second beam IB2 may be separate from each other along the first horizontal direction.

When both lower corners of the third total reflection surface 166 of the second prism 160 are aligned with both upper corners of the first total reflection surface 126 of the first prism 120, the incidence surface 162 and the exit surface 164 of the second prism 160 may be accurately perpendicular to the first horizontal direction, and the third and fourth total reflection surfaces 166 and 168 of the second prism 160 may be accurately inclined to the first horizontal direction at the angle of about 45°.

Additionally, the total internal reflection prism unit 100b may further include at least one third prism. The third prism may be arranged over the second prism 160. The third prism may have a parallelepiped shape. The third prism may have a length measured in the second horizontal direction different from the lengths of the first prism 120 and the second prism 160. For example, the length of the third prism may be longer than the length of the second prism 160. Alternatively, the length of the third prism may be shorter than the length of the first prism 120. Further, the length of the third prism may be longer than the length of the first prism 120 and shorter than the length of the second prism 160.

According to example embodiments, the first prism and the second prism may totally reflect one light along the same horizontal direction to redistribute the horizontally discrete three beams.

FIG. 7 is a perspective view illustrating a total internal reflection prism unit in accordance with example embodiments. A total internal reflection prism unit 100c of this example embodiment may include elements substantially the same as those of the total internal reflection prism unit 100b in FIG. 6 except for positions of the first and second prisms. Thus, the same reference numerals may refer to the same elements and any further illustrations with respect to the same elements may be omitted herein for brevity.

Referring to FIG. 7, the second prism 160 may be arranged under the first prism 120. Thus, the first beam IB1 exiting from the first prism 120 may be positioned higher than the second beam IB2 exiting from the second prism 160. Because the exit surface 124 of the first prism 120 and the exit surface 164 of the second prism 160 may be separated along the second horizontal direction, the first beam IB1 and the second beam IB2 may also be separated along the second horizontal direction.

Additionally, the total internal reflection prism unit 100c may further include at least one third prism. The third prism may be arranged over the second prism 160. The third prism may have a parallelepiped shape. The third prism may have a length measured in the second horizontal direction different from the lengths of the first prism 120 and the second prism 160. For example, the length of the third prism may be longer than the length of the second prism 160. Alternatively, the length of the third prism may be shorter than the length of the first prism 120. Further, the length of the third prism may be longer than the length of the first prism 120 and shorter than the length of the second prism 160.

Figure 8:
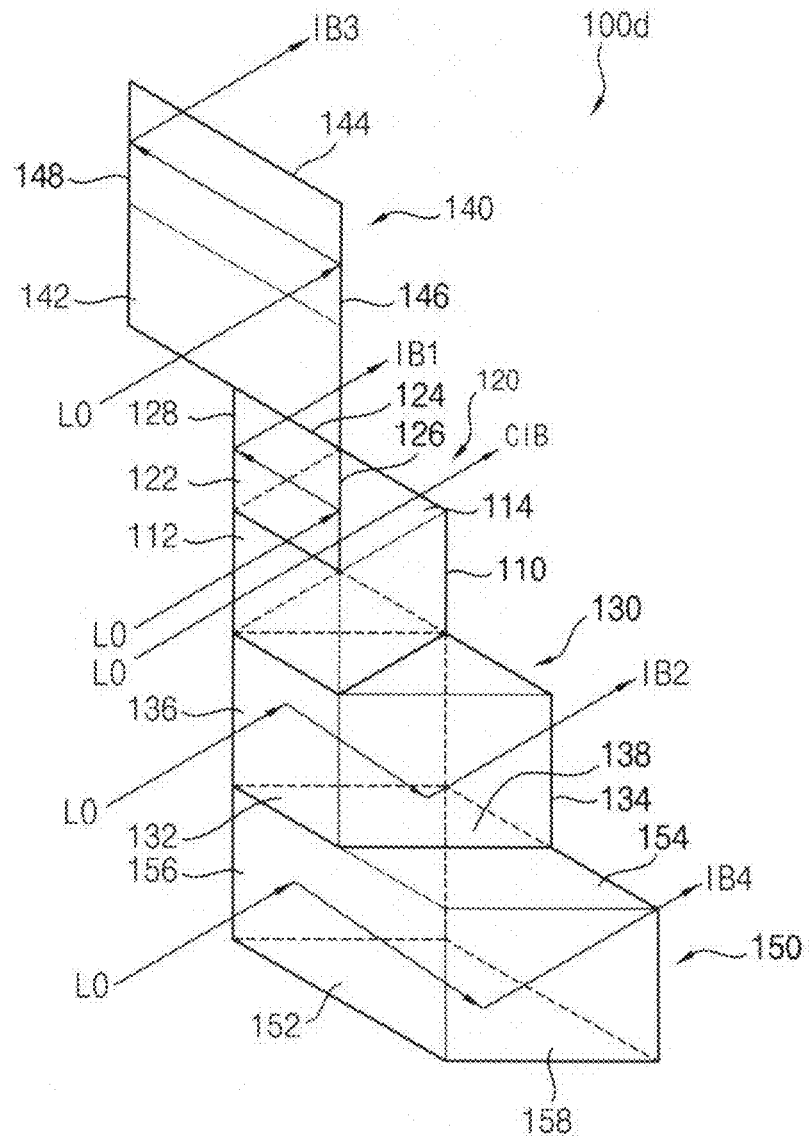
FIG. 8 illustrates a perspective view of a total internal reflection prism unit viewed from an incidence direction in accordance with example embodiments.
Figure 10:
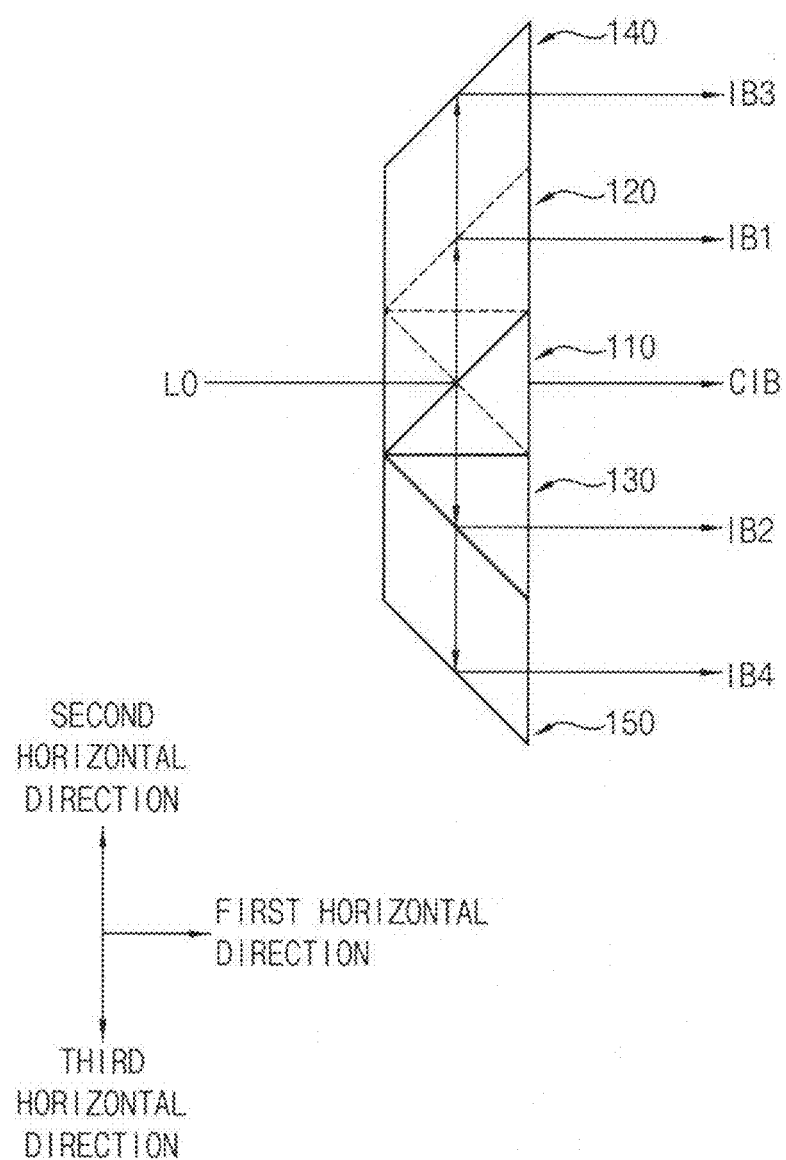
FIG. 10 illustrates a plan view of the total internal reflection prism unit in FIG. 8.

FIG. 8 is a perspective view illustrating a total internal reflection prism unit viewed from an incidence direction in accordance with example embodiments. FIG. 9 is a perspective view illustrating the total internal reflection prism unit in FIG. 8 viewed from an exit direction. FIG. 10 is a plan view illustrating the total internal reflection prism unit in FIG. 8.

A total internal reflection prism unit 100d of this example embodiment may include elements substantially the same as those of the total internal reflection prism unit 100 in FIG. 1 except for further including third and fourth prisms. Thus, the same reference numerals may refer to the same elements and any further illustrations with respect to the same elements may be omitted herein for brevity.

Referring to FIGS. 8 to 10, a third prism 140 may be arranged over the first prism 120. The third prism 140 may have a parallelepiped shape. Thus, the third prism 140 may have two long side surfaces substantially parallel to each other, two short side surfaces substantially parallel to each other, an upper surface and a lower surface.

The third prism 140 may have a thickness substantially the same as that of the first prism 120. The third prism 140 may have a width measured in the first horizontal direction substantially the same as that of the first prism 120.

Alternatively, the third prism 140 may have a length measured in the second horizontal direction longer than that of the first prism 120. In example embodiments, the length of the third prism 140 may be about twice that of the first prism 120, but is not limited thereto. The third prism 140 may have a shape in which the two first prisms 120 may be serially arranged along the second horizontal direction. The lower surface of the third prism 140 may make contact with the upper surface of the first prism 120.

The third prism 140 may have an incidence surface 142 substantially coplanar with the incidence surface 122 of the first prism 120. The incidence surface 142 of the third prism 140 may be substantially perpendicular to the first horizontal direction. Thus, the light L0 incident in the first horizontal direction may pass through, not be refracted from, the incidence surface 142 of the third prism 140.

In example embodiments, because the length of the third prism 140 may be twice that of the first prism 120, the incidence surface 142 of the third prism 140 may be twice the size of the incidence surface 122 of the first prism 120. Thus, a right half portion of the incidence surface 142 of the third prism 140 may protrude from the incidence surface 122 of the first prism 120 along the second horizontal direction.

The third prism 140 may have an exit surface 144 opposite to the incidence surface 142. The exit surface 144 of the third prism 140 may be substantially coplanar with the exit surface 124 of the first prism 120. The exit surface 144 of the third prism 140 may be substantially perpendicular to the first horizontal direction.

In example embodiments, because the length of the third prism 140 is twice that of the first prism 120, the exit surface 144 of the third prism 140 may be twice the size of the exit surface 124 of the first prism 120. Thus, a right half portion of the exit surface 144 of the third prism 140 may protrude from the exit surface 124 of the first prism 120 along the second horizontal direction. That is, the exit surface 144 of the third prism 140 may be separated from the exit surface 124 of the first prism 120 along the second horizontal direction.

The third prism 140 may have a fifth total reflection surface 146. The fifth total reflection surface 146 of the third prism 140 may be inclined to the side surface of the central prism 110 at an angle of about 45° along the counter clockwise direction. Particularly, the fifth total reflection surface 146 of the third prism 140 may be substantially coplanar with the first total reflection surface 126 of the first prism 120. The fifth total reflection surface 146 of the third prism 140 may totally reflect the light L0 incident in the first direction along the second horizontal direction. Thus, the light L0 passing through the incidence surface 142 of the third prism 140 may be totally reflected from the fifth total reflection surface 146 of the third prism 140. The totally reflected light L0 from the fifth total reflection surface 146 may be incident on a sixth total reflection surface 148 of the third prism 140 along the second horizontal direction.

The sixth total reflection surface 148 of the third prism 140 may be substantially parallel to the fifth total reflection surface 146 of the third prism 140. Thus, the sixth total reflection surface 148 of the third prism 140 may be inclined to the side surface of the central prism 110 at an angle of about 45° along the counter clockwise direction. That is, the sixth total reflection surface 148 of the third prism 140 may be substantially parallel to the second total reflection surface 128 of the first prism 120.

In example embodiments, because the length of the third prism 140 may be twice that of the first prism 120, the sixth total reflection surface 148 of the third prism 140 may be discrete from the second total reflection surface 128 of the first prism 120 along the second horizontal direction. The sixth total reflection surface 148 of the third prism 140 may totally reflect the totally reflected light L0 from the fifth total reflection surface 146 along the first horizontal direction. The totally reflected light L0 from the sixth total reflection surface 148 may be incident on the exit surface 144 of the third prism 140. Thus, a third beam IB3 may exit from the exit surface 144 of the third prism 140.

Because the exit surface 144 of the third prism 140 is spaced apart from the exit surface 124 of the first prism 120 in the second horizontal direction, the third beam IB3 may be on a vertical line different from that of the first beam IB1. Further, the third beam IB3 may be separate from the first beam IB1 in the second horizontal direction. Thus, the third beam IB3, the first beam IB1 and the central beam CIB may not overlap each other on the same vertical line. That is, the first beam IB1, the third beam IB3 and the second beam IB2 may be discrete from each other along the second horizontal direction.

When both lower corners of the fifth total reflection surface 146 of the third prism 140 are aligned with both upper corners of the first total reflection surface 126 of the first prism 120, the incidence surface 142 and the exit surface 144 of the third prism 140 may be accurately perpendicular to the first horizontal direction, and the fifth and sixth total reflection surfaces 146 and 148 of the third prism 140 may be accurately inclined to the first horizontal direction at the angle of about 45°.

A fourth prism 150 may be arranged under the second prism 130. The fourth prism 150 may have a parallelepiped shape substantially the same as that of the third prism 140. Thus, the fourth prism 150 may have two long side surfaces substantially parallel to each other, two short side surfaces substantially parallel to each other, an upper surface, and a lower surface.

The fourth prism 150 may have a thickness substantially the same as that of the second prism 130. The fourth prism 150 may have a width measured in the first horizontal direction substantially the same as that of the second prism 120. In contrast, the fourth prism 150 may have a length measured in the second horizontal direction longer than that of the second prism 130.

In example embodiments, the length of the fourth prism 150 may be about two times the length of the second prism 130, but is note limited thereto. Further, the length of the fourth prism 150 may be substantially the same as that of the third prism 140. Alternatively, the length of the fourth prism 150 may be different from that of the third prism 140. When the length of the fourth prism 150 is about twice the length of the second prism 130, the fourth prism 150 may have a shape in which the two second prisms 130 may be serially arranged along the second horizontal direction. The lower surface of the fourth prism 150 may make contact with the lower surface of the second prism 130.

The fourth prism 150 may have an incidence surface 152 substantially coplanar with the incidence surface 132 of the second prism 130. The incidence surface 152 of the fourth prism 150 may be substantially perpendicular to the first horizontal direction. Thus, the light L0 incident in the first horizontal direction may pass through, not be refracted from, the incidence surface 152 of the fourth prism 150.

In example embodiments, because the length of the fourth prism 150 may be twice that of the second prism 130, the incidence surface 152 of the fourth prism 150 may have a size twice that of the incidence surface 132 of the second prism 130. Thus, a left half portion of the incidence surface 152 of the fourth prism 150 may protrude from the incidence surface 132 of the second prism 130 along the third horizontal direction.

The fourth prism 150 may have an exit surface 154 opposite to the incidence surface 152. The exit surface 154 of the fourth prism 150 may be substantially coplanar with the exit surface 134 of the second prism 130. The exit surface 154 of the fourth prism 150 may be substantially perpendicular to the first horizontal direction.

In example embodiments, because the length of the fourth prism 150 is twice that of the second prism 130, the exit surface 154 of the fourth prism 150 has a size twice that of the exit surface 134 of the second prism 130. Thus, a left half portion of the exit surface 154 of the fourth prism 150 may protrude from the exit surface 134 of the second prism 130 along the third horizontal direction. That is, the exit surface 154 of the fourth prism 150 may be discrete, e.g., separate, from the exit surface 134 of the second prism 130 along the third horizontal direction.

The fourth prism 150 may have a seventh total reflection surface 156. The seventh total reflection surface 156 of the fourth prism 150 may be inclined to the side surface of the central prism 110 at an angle of about 45° along the counter clockwise direction. Particularly, the seventh total reflection surface 156 of the fourth prism 150 may be substantially coplanar with the third total reflection surface 136 of the second prism 130. The seventh total reflection surface 156 of the fourth prism 150 may totally reflect the light L0 incident in the first direction along the third horizontal direction. Thus, the light L0 passing through the incidence surface 152 of the fourth prism 150 may be totally reflected from the seventh total reflection surface 156 of the fourth prism 150. The totally reflected light L0 from the seventh total reflection surface 156 may be incident on an eighth total reflection surface 158 of the fourth prism 150 along the third horizontal direction.

The eighth total reflection surface 158 of the fourth prism 150 may be substantially parallel to the seventh total reflection surface 156 of the fourth prism 150. Thus, the eighth total reflection surface 158 of the fourth prism 150 may be inclined to the side surface of the central prism 110 at an angle of about 45° along the counter clockwise direction. That is, the eighth total reflection surface 158 of the fourth prism 150 may be substantially parallel to the fourth total reflection surface 138 of the second prism 130.

In example embodiments, because the length of the fourth prism 150 may be twice the length of the second prism 130, the eighth total reflection surface 158 of the fourth prism 150 may be discrete from the fourth total reflection surface 138 of the second prism 130 along the third horizontal direction. The eighth total reflection surface 158 of the fourth prism 150 may totally reflect the totally reflected light L0 from the seventh total reflection surface 156 along the first horizontal direction. The totally reflected light L0 from the eighth total reflection surface 158 may be incident on the exit surface 154 of the fourth prism 150. Thus, a fourth beam IB4 may exit from the exit surface 154 of the fourth prism 150.

Because the exit surface 154 of the fourth prism 150 is discrete from the exit surface 134 of the second prism 130 in the third horizontal direction, the fourth beam IB4 may not be on a vertical line as that of the second beam IB2. Further, the fourth beam IB4 may be discrete from the second beam IB2 in the third horizontal direction. Thus, the fourth beam IB4, the second beam IB2 and the central beam CIB may not overlap each other on the same vertical line. That is, the second beam IB2, the fourth beam IB4 and the second beam IB2 may be discrete from each other along the third horizontal direction.

When both upper corners of the seventh total reflection surface 156 of the fourth prism 150 are aligned with both lower corners of the third total reflection surface 136 of the second prism 130, the incidence surface 152 and the exit surface 154 of the fourth prism 150 may be accurately perpendicular to the first horizontal direction, and the seventh and eighth total reflection surfaces 156 and 158 of the fourth prism 150 may be accurately inclined to the first horizontal direction at the angle of about 45°.

FIGS. 8 and 9 illustrate show that the three light beams L0 are incident on the incidence surface 112 of the central prism 110, the incidence surface 122 of the first prism 120, the incidence surface 132 of the second prism 130, the incidence surface 142 of the third prism 140 and the incidence surface 152 of the fourth prism 150, respectively, for convenience of explanation. However, as shown in FIG. 10, a single light beam L0 may be incident on the incidence surface 112 of the central prism 110, the incidence surface 122 of the first prism 120, the incidence surface 132 of the second prism 130, the incidence surface 142 of the third prism 140, and the incidence surface 152 of the fourth prism 150 may be only one.

Figure 11:
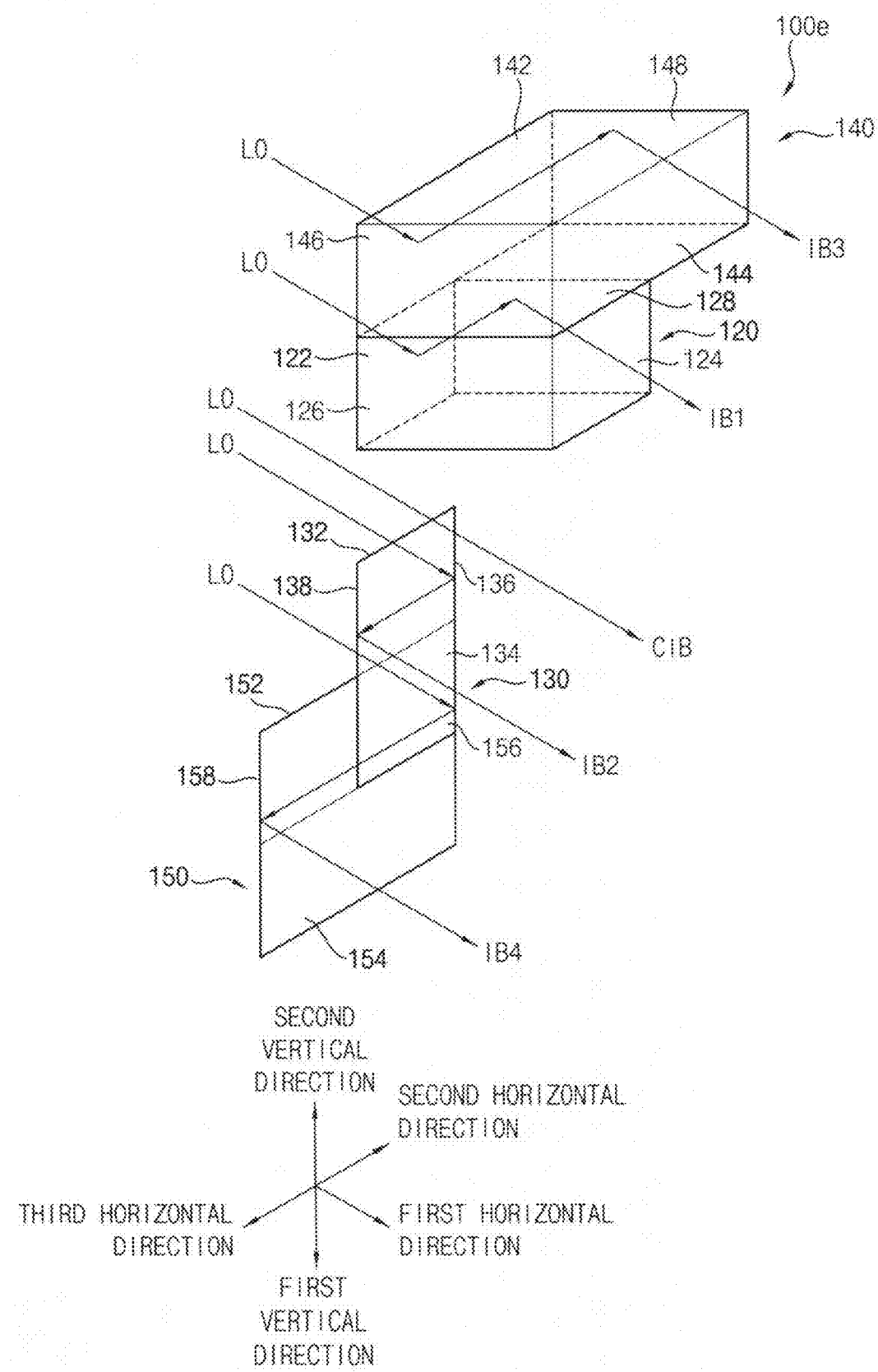
FIG. 11 illustrates a perspective view of a total internal reflection prism unit in accordance with example embodiments.

FIG. 11 is a perspective view illustrating a total internal reflection prism unit in accordance with example embodiments. Referring to FIG. 11, a total internal reflection prism unit 100e of this example embodiment may include the first prism 120, the second prism 130, the third prism 140, and the fourth prism 150. That is, the total internal reflection prism unit 100e may not include the central prism 110 in FIG. 8.

The functions of the first to fourth prisms 120, 130, 140, and 150 were illustrated with reference to FIGS. 1 and 8. Thus, any further illustrations with respect to the first to fourth prisms 120, 130, 140, and 150 may be omitted herein for brevity.

According to example embodiments, the prisms having the parallelepiped shape may totally reflect one light to redistribute the light into the horizontally discrete beams. Further, the total internal reflection prism unit to totally reflect the light may be manufactured by simply stacking the prisms having the parallelepiped shape.

In example embodiments, the two or four prisms except for the central prism may redistribute the light into the two or four beams. However, numbers of the prisms in the total internal reflection prism unit may not be restricted within a specific number. The numbers of the prism may be changed in accordance with a number of the light beams desired.

Total Internal Reflection Prism Assembly

Figure 12:
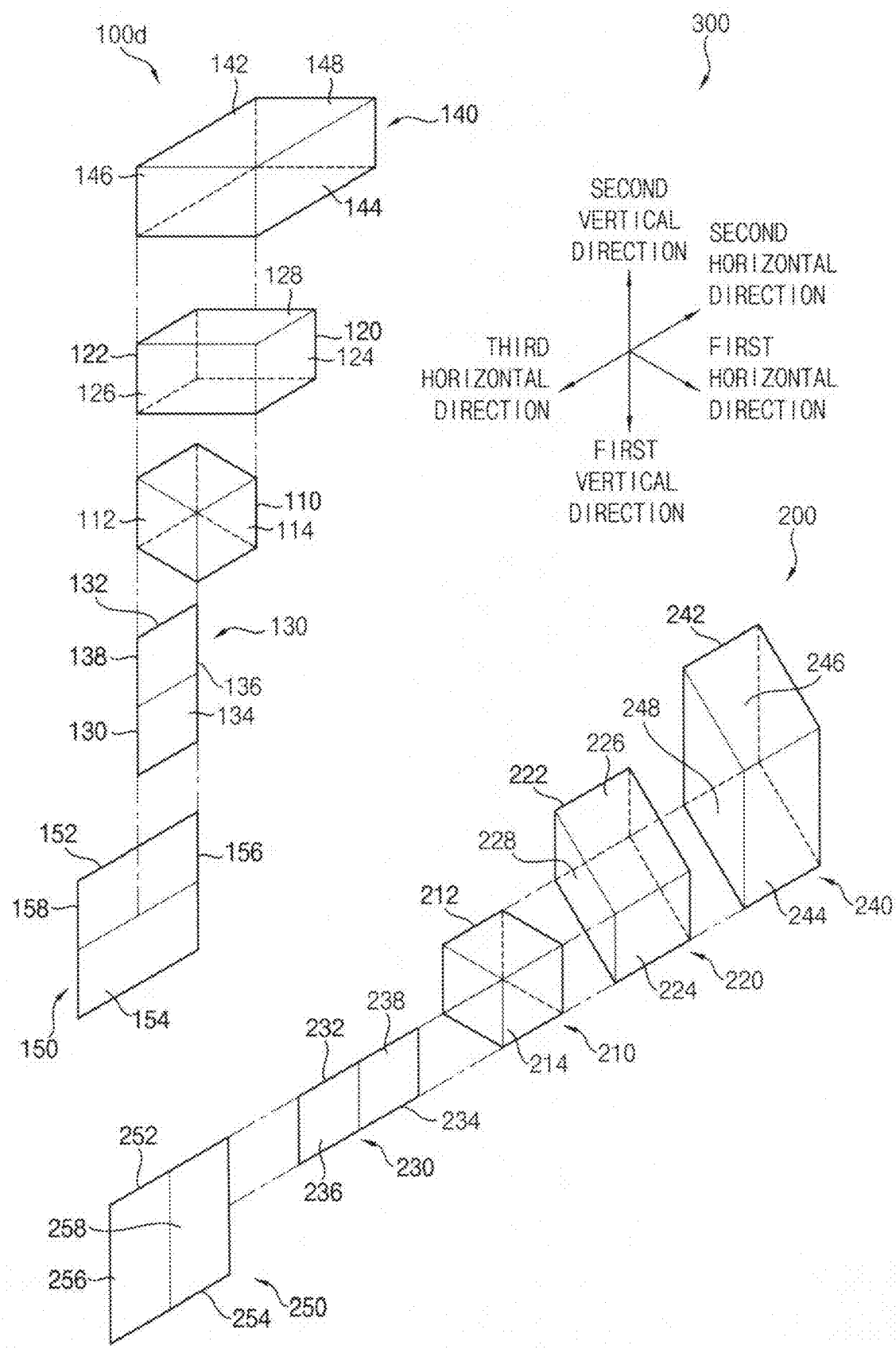
FIG. 12 illustrates an exploded perspective view of a total internal reflection prism assembly including the total internal reflection prism unit in FIG. 9.
Figure 13:
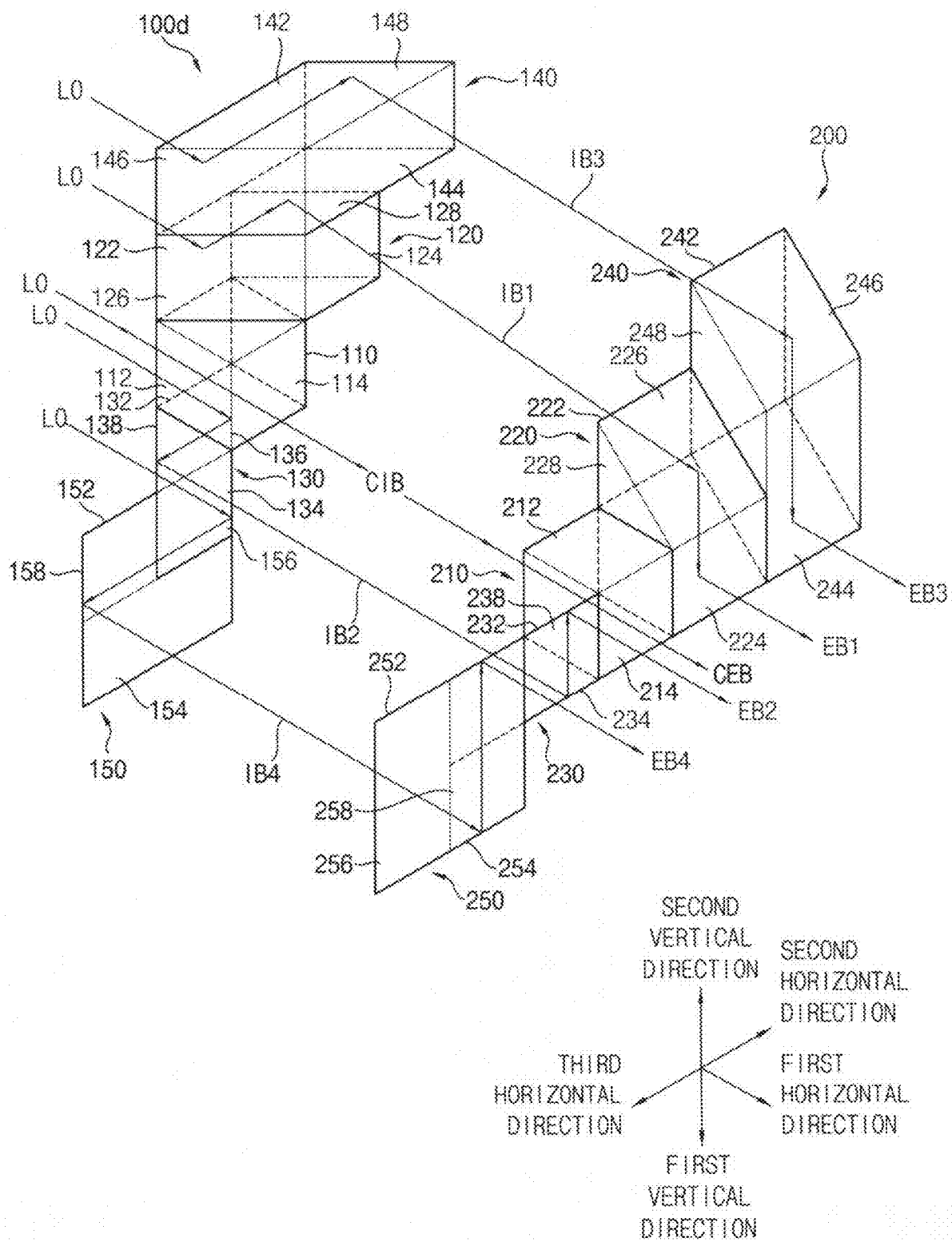
FIG. 13 illustrates a perspective view of the total internal reflection assembly in FIG. 12.

FIG. 12 is an exploded perspective view illustrating a total internal reflection prism assembly including the total internal reflection prism unit in FIG. 9. FIG. 13 is a perspective view illustrating the total internal reflection assembly in FIG. 12. Referring to FIGS. 12 and 13, a total internal reflection prism assembly 300 of this example embodiment may include a total reflection incidence prism unit 100d and a total reflection exit prism unit 200.

The total reflection incidence prism unit 100d may include the central incidence prism 110, the first incidence prism 120, the second incidence prism 130, the third incidence prism 140, and the fourth incidence prism 150. The central incidence prism 110 may be substantially the same as the central prism 110 in FIG. 9. The first incidence prism 120 may be substantially the same as the first prism 120 in FIG. 9. The third incidence prism 140 may be substantially the same as the third prism 140 in FIG. 9. The fourth incidence prism 150 may be substantially the same as the fourth prism 150 in FIG. 9.

The total reflection exit prism unit 200 may include a central exit prism 210, a first exit prism 220, a second exit prism 230, a third exit prism 240, and a fourth exit prism 250.

The central exit prism 210 may have a cube shape substantially the same as that of the central incidence prism 110. The central exit prism 210 may include an incidence surface 212 and an exit surface 214 substantially perpendicular to the first horizontal direction. Thus, the central incidence beam CIB exiting from the central incidence prism 110 may pass through, not refracted from, the incidence surface 212 and the exit surface 214 of the central exit prism 210. A central exit beam CEB may exit from the central exit prism 210 along the first horizontal direction.

The first exit prism 220 may be arranged on a right side surface of the central exit prism 210. The first exit prism 220 may have a parallelepiped shape substantially the same as that of the second incidence prism 130 of the total reflection incidence prism unit 100d.

The first exit prism 220 may include an incidence surface 222 substantially coplanar with the incidence surface 212 of the central exit prism 210. The incidence surface 222 of the first exit prism 220 may be positioned on a horizontal plane on which the exit surface 124 of the first incidence prism 120 in the total reflection incidence prism unit 100d. In contrast, the exit surface 224 of the first exit prism 220 may be positioned on a horizontal plane on which the exit surface 214 of the central exit prism 210 may be positioned.

The first exit prism 220 may include a first total reflection exit surface 226. The first total reflection exit surface 226 may be connected between upper ends of the incidence surface 222 and the exit surface 224 of the first exit prism 220. The first total reflection exit surface 226 of the first exit prism 220 may be inclined to the first horizontal direction at an angle of about 45°. Further, the first exit prism 220 may include a second total reflection exit surface 228. The second total reflection exit surface 228 may be connected between lower ends of the incidence surface 222 and the exit surface 224 of the first exit prism 220. The second total reflection exit surface 228 of the first exit prism 220 may be inclined to the first horizontal direction at an angle of about 45°. Thus, the first incidence beam IB1 exiting from the exit surface 124 of the first incidence prism 120 may be totally reflected from the first total reflection exit surface 226 along a first vertical direction, i.e., a downwardly vertical direction. The totally reflected beam from the first total reflection exit surface 226 along the first vertical direction may be totally reflected from the second total reflection exit surface 228 along the first horizontal direction. A first exit beam EB1 may exit from the exit surface 224 of the first exit prism 220.

Because the exit surface 224 of the first exit prism 220 may be positioned on the horizontal plane on which the exit surface 214 of the central exit prism 210 may be positioned, the first exit beam EB1 may be positioned on a horizontal plane on which the central exit beam CEB may be positioned. That is, the first exit beam EB1 and the central exit beam CEB may be discrete on the same horizontal plane along the second horizontal direction.

The first exit prism 220 may be obtained by rotating the second incidence prism 130 of the total reflection incidence prism unit 100d with respect to the first vertical direction at an angle of about 180°, by rotating the second incidence prism 130 with respect to the second horizontal direction at an angle of 90°, and by arranging the twice rotated second incidence prism 130 on the right side surface of the central exit prism 210.

The third exit prism 240 may be arranged on a right side surface of the first exit prism 220. The third exit prism 240 may have a parallelepiped shape substantially the same as that of the fourth incidence prism 150 of the total reflection incidence prism unit 100d.

The third exit prism 240 may include an incidence surface 242 substantially coplanar with the incidence surface 222 of the first exit prism 220. The incidence surface 242 of the third exit prism 240 may be positioned on a horizontal plane on which the exit surface 144 of the third incidence prism 140 in the total reflection incidence prism unit 100d. In contrast, the exit surface 244 of the third exit prism 240 may be positioned on a horizontal plane on which the exit surface 224 of the first exit prism 220 may be positioned.

The third exit prism 240 may include a fifth total reflection exit surface 246. The fifth total reflection exit surface 246 may be connected between upper ends of the incidence surface 242 and the exit surface 244 of the third exit prism 240. The fifth total reflection exit surface 246 of the third exit prism 240 may be inclined to the first horizontal direction at an angle of about 45°. Further, the third exit prism 240 may include a sixth total reflection exit surface 248. The sixth total reflection exit surface 248 may be connected between lower ends of the incidence surface 242 and the exit surface 244 of the third exit prism 240. The sixth total reflection exit surface 248 of the third exit prism 240 may be inclined to the first horizontal direction at an angle of about 45°. Thus, the third incidence beam IB3 exiting from the exit surface 144 of the third incidence prism 140 may be totally reflected from the fifth total reflection exit surface 246 along the first vertical direction. The totally reflected beam from the fifth total reflection exit surface 246 along the first vertical direction may be totally reflected from the sixth total reflection exit surface 248 along the first horizontal direction. A third exit beam EB3 may exit from the exit surface 244 of the third exit prism 240. The third exit beam EB3 may be positioned on a horizontal plane on which the central exit beam CEB and the first exit beam EB1 may be positioned. Particularly, the first exit beam EB1, the third exit beam EB3, and the central exit beam CEB may be discrete on the same horizontal plane along the second horizontal direction.

The third exit prism 240 may be obtained by rotating the fourth incidence prism 150 of the total reflection incidence prism unit 100*d* with respect to the first vertical direction at an angle of about 180°, by rotating the fourth incidence prism 150 with respect to the second horizontal direction at an angle of 90°, and by arranging the twice rotated fourth incidence prism 150 on the right side surface of the first exit prism 220.

The second exit prism 230 may be arranged on a left side surface of the central exit prism 210. The second exit prism 230 may have a parallelepiped shape substantially the same as that of the first incidence prism 120 of the total reflection incidence prism unit 100*d*.

The second exit prism 230 may include an incidence surface 232 substantially coplanar with the incidence surface 212 of the central exit prism 210. The incidence surface 232 of the second exit prism 230 may be positioned on a horizontal plane on which the exit surface 134 of the second incidence prism 130 in the total reflection incidence prism unit 100*d*. In contrast, the exit surface 234 of the second exit prism 230 may be positioned on a horizontal plane on which the exit surface 214 of the central exit prism 210 may be positioned.

The second exit prism 230 may include a third total reflection exit surface 236. The third total reflection exit surface 236 may be connected between lower ends of the incidence surface 232 and the exit surface 234 of the second exit prism 230. The third total reflection exit surface 236 of the second exit prism 230 may be inclined to the first horizontal direction at an angle of about 45°. Further, the second exit prism 230 may include a fourth total reflection exit surface 238. The fourth total reflection exit surface 238 may be connected between upper ends of the incidence surface 232 and the exit surface 234 of the second exit prism 230. The fourth total reflection exit surface 238 of the second exit prism 230 may be inclined to the first horizontal direction at an angle of about 45°. Thus, the second incidence beam IB2 exiting from the exit surface 134 of the second incidence prism 130 may be totally reflected from the third total reflection exit surface 236 along a second vertical direction opposite to the first vertical direction, i.e., an upwardly vertical direction. The totally reflected beam from the third total reflection exit surface 236 along the second vertical direction may be totally reflected from the fourth total reflection exit surface 238 along the first horizontal direction. A second exit beam EB2 may exit from the exit surface 234 of the second exit prism 230.

Because the exit surface 234 of the second exit prism 230 may be positioned on the horizontal plane on which the exit surface 214 of the central exit prism 210 may be positioned, the second exit beam EB2 may be positioned on a horizontal plane on which the central exit beam CEB may be positioned. Particularly, the second exit beam EB2 and the central exit beam CEB may be discrete on the same horizontal plane along the third horizontal direction.

The second exit prism 230 may be obtained by rotating the first incidence prism 120 of the total reflection incidence prism unit 100*d* with respect to the first vertical direction at an angle of about 180°, by rotating the first incidence prism 120 with respect to the third horizontal direction at an angle of 90°, and by arranging the twice rotated first incidence prism 120 on the left side surface of the central exit prism 210.

The fourth exit prism 250 may be arranged on a left side surface of the second exit prism 230. The fourth exit prism 250 may have a parallelepiped shape substantially the same as that of the third incidence prism 140 of the total reflection incidence prism unit 100*d*.

The fourth exit prism 250 may include an incidence surface 252 substantially coplanar with the incidence surface 232 of the second exit prism 230. The incidence surface 252 of the fourth exit prism 250 may be positioned on a horizontal plane on which the exit surface 154 of the fourth incidence prism 150 in the total reflection incidence prism unit 100*d*. In contrast, the exit surface 254 of the fourth exit prism 250 may be positioned on a horizontal plane on which the exit surface 234 of the second exit prism 230 may be positioned.

The fourth exit prism 250 may include a seventh total reflection exit surface 256. The seventh total reflection exit surface 256 may be connected between lower ends of the incidence surface 252 and the exit surface 254 of the fourth exit prism 250. The seventh total reflection exit surface 256 of the fourth exit prism 250 may be inclined to the first horizontal direction at an angle of about 45°. Further, the fourth exit prism 250 may include an eighth total reflection exit surface 258. The eighth total reflection exit surface 258 may be connected between upper ends of the incidence surface 252 and the exit surface 254 of the fourth exit prism 250. The eighth total reflection exit surface 258 of the fourth exit prism 250 may be inclined to the first horizontal direction at an angle of about 45°. Thus, the fourth incidence beam IB4 exiting from the exit surface 154 of the fourth incidence prism 150 may be totally reflected from the seventh total reflection exit surface 256 along the second vertical direction. The totally reflected beam from the seventh total reflection exit surface 256 along the second vertical direction may be totally reflected from the eighth total reflection exit surface 258 along the first horizontal direction. A fourth exit beam EB4 may exit from the exit surface 254 of the fourth exit prism 250. The fourth exit beam EB4 may be positioned on a horizontal plane on which the central exit beam CEB and the second exit beam EB2 may be positioned. Particularly, the second exit beam EB2, the fourth exit beam EB4 and the central exit beam CEB may be discrete on the same horizontal plane along the second horizontal direction. As a result, the first exit beam EB1, the third exit beam EB3, the second exit beam EB2, the fourth exit beam EB4 and the central exit beam CEB may be discrete on the same horizontal plane.

The fourth exit prism 250 may be obtained by rotating the third incidence prism 140 of the total reflection incidence prism unit 100d with respect to the first vertical direction at an angle of about 180°, by rotating the third incidence prism 140 with respect to the third horizontal direction at an angle of 90°, and by arranging the twice rotated third incidence prism 140 on the left side surface of the second exit prism 230.

That is, the total reflection exit prism unit 200 may be obtained by rotating the total reflection incidence prism unit 100d with respect to the first vertical direction at an angle of about 180°, and by rotating the total reflection incidence prism unit 100d with respect to the second horizontal direction at an angle of 90°. Thus, it may not be required to additionally assemble the total reflection exit prism unit 200.

In example embodiments, the total internal reflection prism assembly 300 may include the central incidence prism 110 and the central exit prism 210. However, as mentioned above, because the central incidence prism 110 and the central exit prism 210 may not have the function for changing the path of the light, the total internal reflection prism assembly 300 may not include the central incidence prism 110 and the central exit prism 210.

Alternatively, the first incidence prism 120 and the third incidence prism 130 of the total reflection incidence prism unit 100d may be reversely arranged. That is, the first incidence prism 120 may be arranged over the third incidence prism 140. Thus, the third incidence prism 140 may be arranged between the central incidence prism 110 and the first incidence prism 120. Further, the second incidence prism 130 and the fourth incidence prism 150 of the total reflection incidence prism unit 100d may be reversely arranged. That is, the second incidence prism 130 may be arranged under the fourth incidence prism 150. Thus, the fourth incidence prism 150 may be arranged between the central incidence prism 110 and the second incidence prism 130.

Alternatively, the first exit prism 220 and the third exit prism 240 of the total reflection exit prism unit 200 may be reversely arranged. That is, the first exit prism 220 may be arranged right the third exit prism 240. Thus, the third exit prism 240 may be arranged between the central exit prism 210 and the first exit prism 220. Further, the second exit prism 230 and the fourth exit prism 250 of the total reflection exit prism unit 200 may be reversely arranged. That is, the second exit prism 230 may be arranged left the fourth exit prism 250. Thus, the fourth exit prism 250 may be arranged between the central exit prism 210 and the second exit prism 230.

Figure 14:
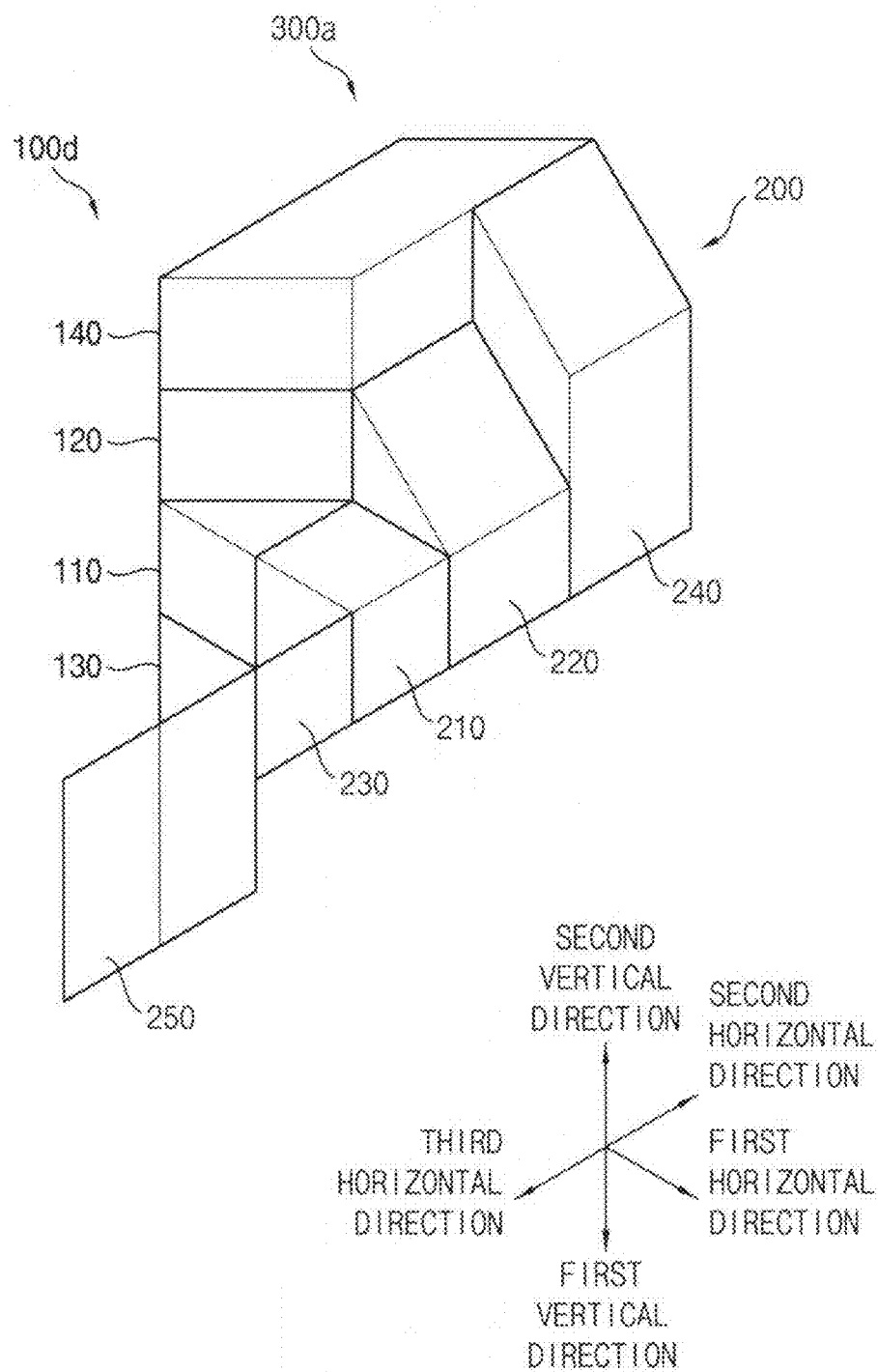
FIG. 14 illustrates an exploded perspective view of a total internal reflection prism assembly in accordance with example embodiments.

FIG. 14 is an exploded perspective view illustrating a total internal reflection prism assembly in accordance with example embodiments.

Referring to FIG. 14, a total internal reflection prism assembly 300a of this example embodiment may include the total reflection incidence prism unit 100d and the total reflection exit prism unit 200 connected with each other. That is, the central incidence prism 110 may be connected with the central exit prism 210. The first incidence prism 120 may be connected with the first exit prism 220. The third incidence prism 140 may be connected with the third exit prism 240. The second incidence prism 130 may be connected with the second exit prism 230. The fourth incidence prism 150 may be connected with the fourth exit prism 250.

Particularly, the exit surface 114 of the central incidence prism 110 may make contact with the incidence surface 212 of the central exit prism 210. The exit surface 124 of the first incidence prism 120 may make contact with the incidence surface 222 of the first exit prism 220. The exit surface 144 of the third incidence prism 140 may make contact with the incidence surface 242 of the third exit prism 240. The exit surface 134 of the second incidence prism 130 may make contact with the incidence surface 232 of the second exit prism 230. The exit surface 154 of the fourth incidence prism 150 may make contact with the incidence surface 252 of the fourth exit prism 250.

The total reflection incidence prism unit 100d and the total reflection exit prism unit 200 may have functions substantially the same as those illustrated with reference to FIGS. 12 and 13. Thus, any further illustrations with respect to the total internal reflection prism assembly 300a may be omitted herein for brevity.

Apparatus for Forming a Line Beam

Figure 15:
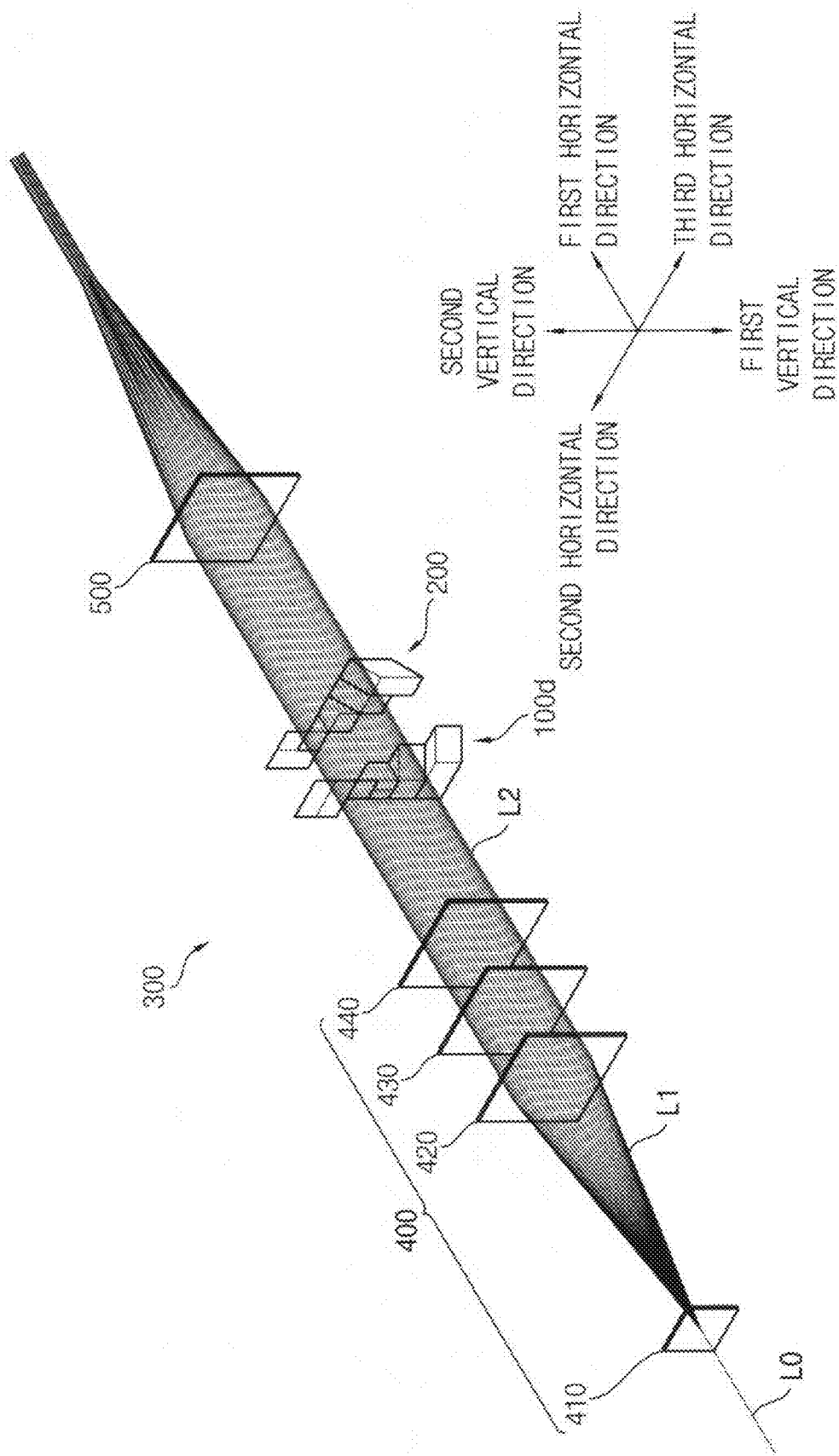
FIG. 15 illustrates a perspective view of an apparatus for forming a line beam including the total internal reflection prism assembly in FIG. 13.
Figure 16:
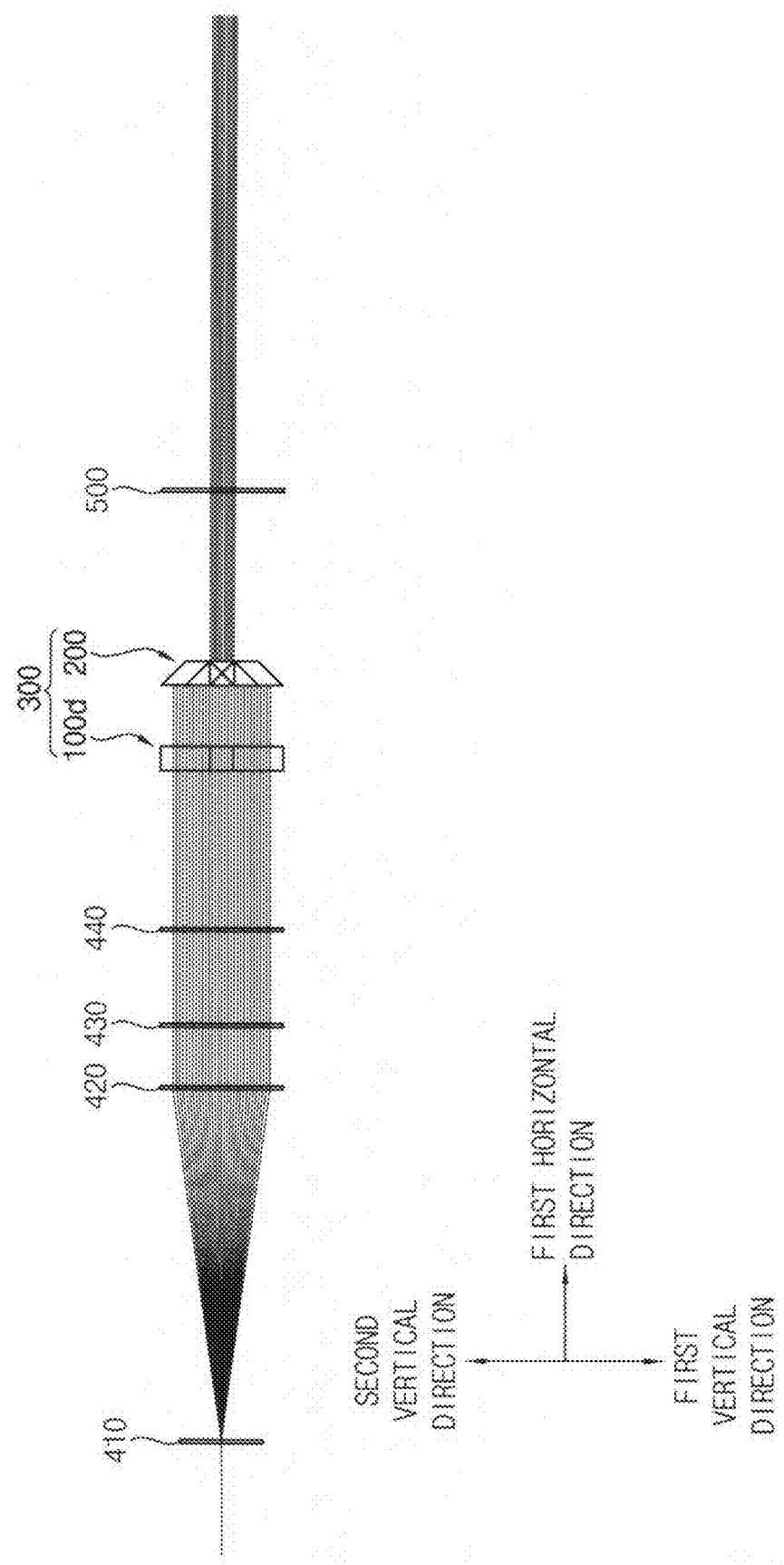
FIG. 16 illustrates a front view of the apparatus in FIG. 15.
Figure 17:
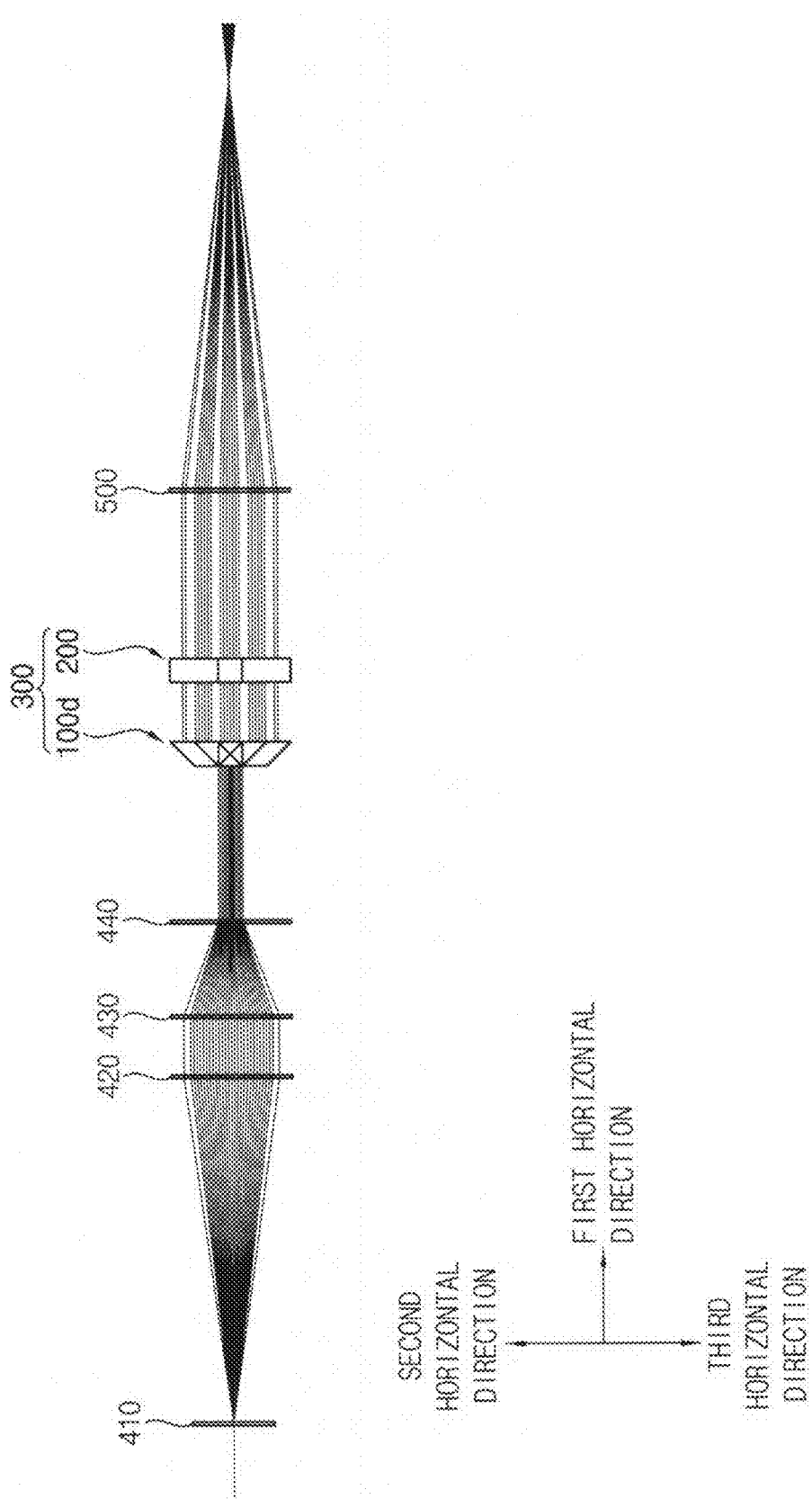
FIG. 17 illustrates a plan view of the apparatus in FIG. 15.

FIG. 15 is a perspective view illustrating an apparatus for forming a line beam including the total internal reflection prism assembly in FIG. 13, FIG. 16 is a front view illustrating the apparatus in FIG. 15, and FIG. 17 is a plan view illustrating the apparatus in FIG. 15. Referring to FIGS. 15 to 17, an apparatus for forming a line beam in accordance with example embodiment may include a beam expander 400, the total internal reflection prism assembly 300, and a condensing lens unit 500.

The beam expander 400 may expand the light L0, which may be emitted from a light source in the first horizontal direction, along the first and second vertical directions to form an elliptical light L2. The elliptical light L2 may have a long axis and a short axis. The long axis may have a length corresponding to a vertical length of the elliptical light L2. The short axis may have a length corresponding to a horizontal length of the elliptical light L2.

The total internal reflection prism assembly 300 may distribute the elliptical light L2 into the beams discrete along the second and third horizontal directions. The total internal reflection prism assembly 300 may include elements substantially the same as those of the total internal reflection prism assembly 300 in FIG. 13. Thus, the same reference numerals may refer to the same elements and any further illustrations with respect to the same elements may be omitted herein for brevity. Alternatively, the apparatus may include the total internal reflection prism assembly 300a in FIG. 14.

Alternatively, when the light L0 emitted from the light source may have a size incident on the incidence surfaces 112, 122, 132, 142 and 152 of the total reflection incidence prism unit 100d, the apparatus may not include the beam expander 400.

The condensing lens unit 500 may condense the redistributed beams along the second and third horizontal directions. The condensing lens unit 500 may reduce gaps between the beams discrete along the second and third horizontal directions to form the line beam having substantially uniform intensity.

Figure 18:
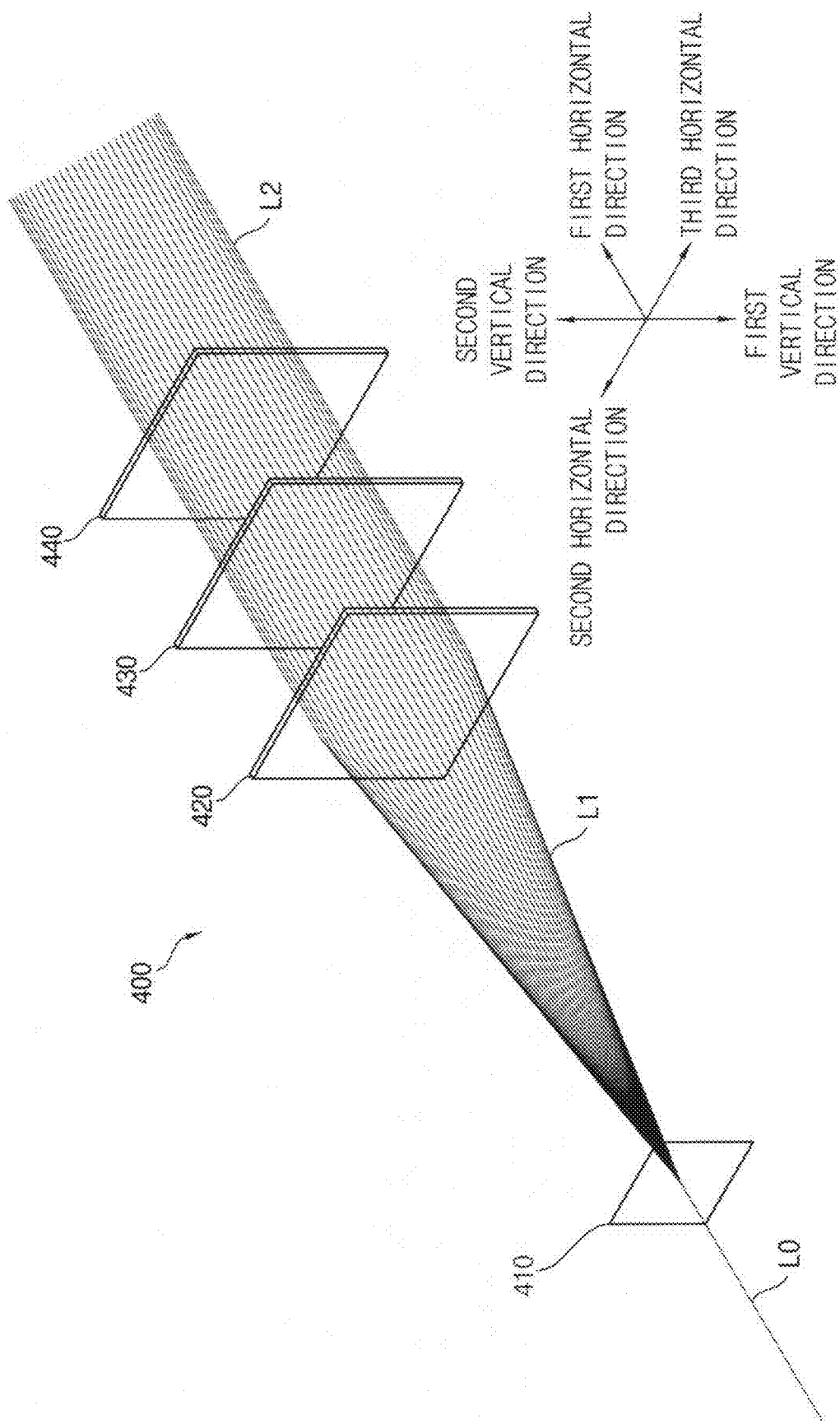
FIG. 18 illustrates a perspective view of a beam expander of the apparatus in FIG. 15.
Figure 19:
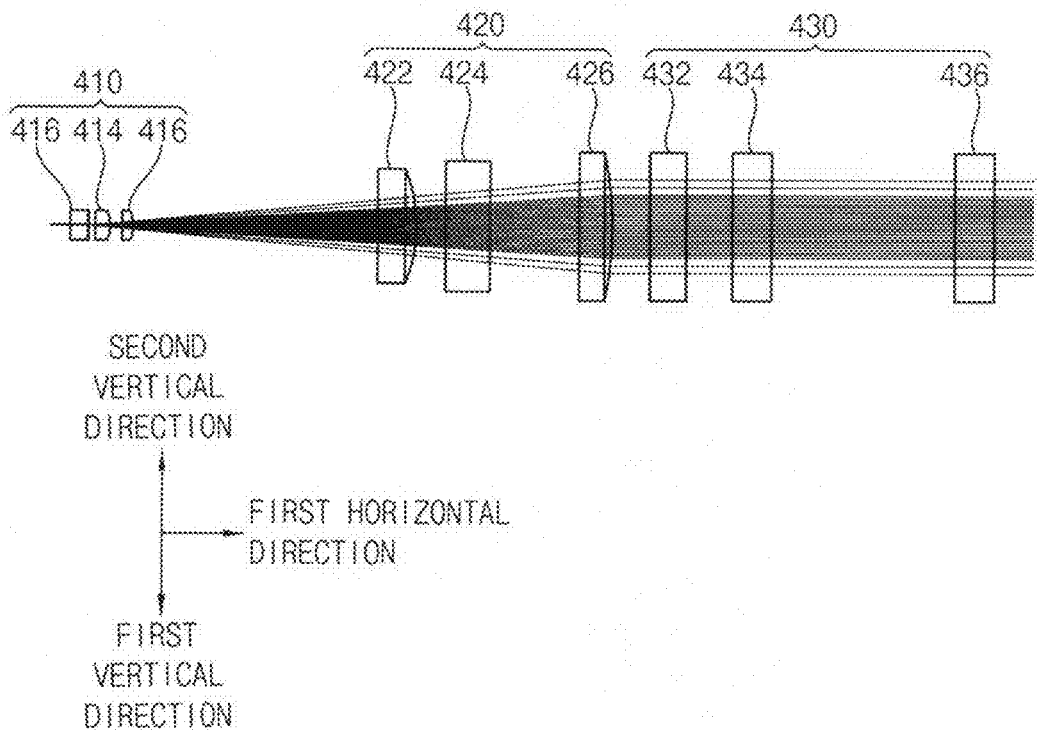
FIG. 19 illustrates a front view of the beam expander in FIG. 18.
Figure 20:
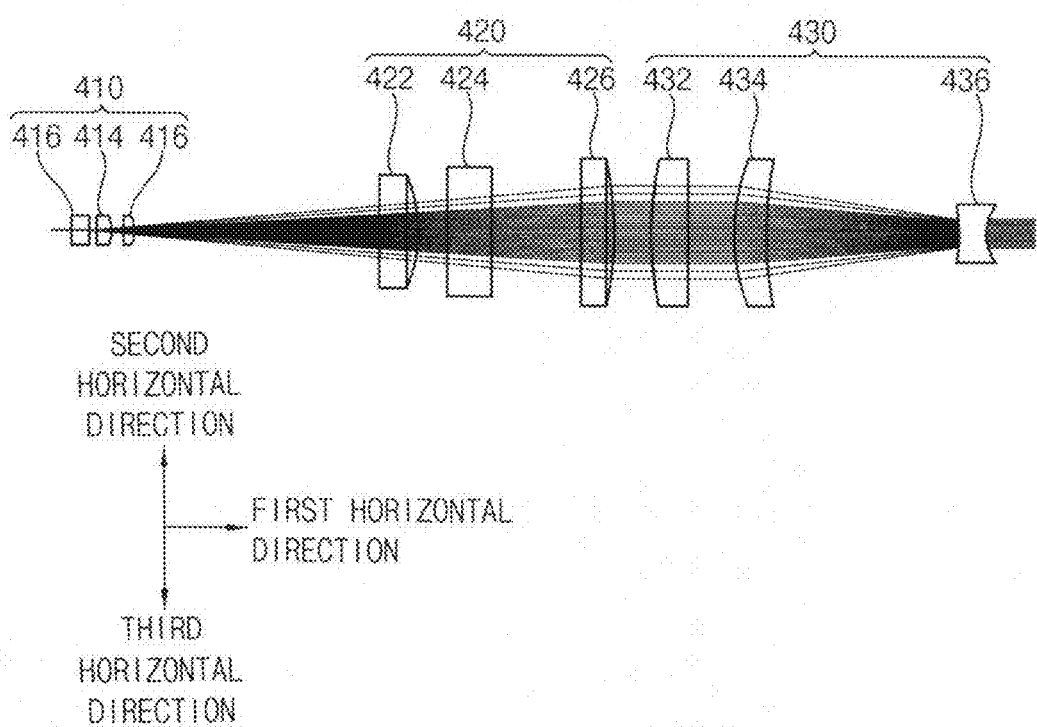
FIG. 20 illustrates a plan view of the beam expander in FIG. 18.

FIG. 18 is a perspective view illustrating a beam expander of the apparatus in FIG. 15, FIG. 19 is a front view illustrating the beam expander in FIG. 18, and FIG. 20 is a plan view illustrating the beam expander in FIG. 18. Referring to FIGS. 18 to 20, the beam expander 400 may include a first lens unit 410, a second lens unit 420, and a third lens unit 430.

The first lens unit 410 may be arranged between the light source and the total internal reflection prism assembly 300.

The first lens unit 410 may expand the light L0 emitted from the light source to form the circular light L1.

The first lens unit 410 may include a first concave lens 412, a second concave lens 414 and a third concave lens 416. The first concave lens 412 may be arranged between the light source and the total internal reflection prism assembly 300 to primarily expand the light L0. The second concave lens 414 may be arranged between the first concave lens 412 and the total internal reflection prism assembly 300 to secondarily expand the primarily expanded light. The third concave lens 416 may be arranged between the second concave lens 414 and the total internal reflection prism assembly 300 to tertiarily expand the secondarily expanded light, thereby forming the circular light L1.

In example embodiments, the first lens unit 410 may include the first to third concave lens 412, 414, and 416. However, the first lens unit 410 may include one, two, or at least four concave lens.

The second lens unit 420 may be arranged between the first lens unit 410 and the total internal reflection prism assembly 300. The second lens unit 420 may include a first convex lens 422, a concave lens 424, and a second convex lens 426. The first convex lens 422 may primarily reduce the circular light L1. The concave lens 424 may expand the primarily reduced circular light L1. The second convex lens 426 may secondarily reduce the expanded circular light L1 to increase the expanded circular light L1 along the first horizontal direction.

The third lens unit 430 may be arranged between the second lens unit 420 and the total internal reflection prism assembly 300. The third lens unit 430 may include a first convex lens 432, a second convex lens 434, and a concave lens 436.

The first convex lens 432 may primarily reduce the circular light L1, which may be increased in the first horizontal direction, along the second and third horizontal directions to form a preliminary elliptical light. The second convex lens 434 may secondarily reduce the preliminary elliptical light along the second and third horizontal directions to form the elliptical light L2. The concave lens 436 may expand the elliptical light L2. The expanded elliptical light L2 may be incident on the total internal reflection prism assembly 300 along the first horizontal direction.

Figure 21:
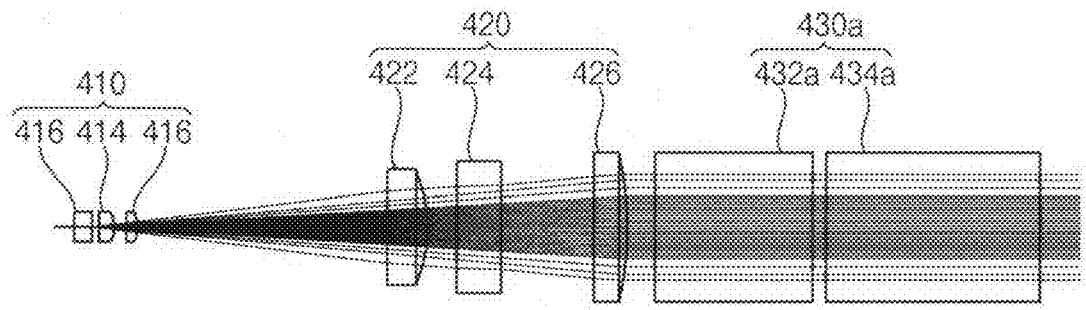
FIG. 21 illustrates a front view of a beam expander in accordance with example embodiments.
Figure 22:
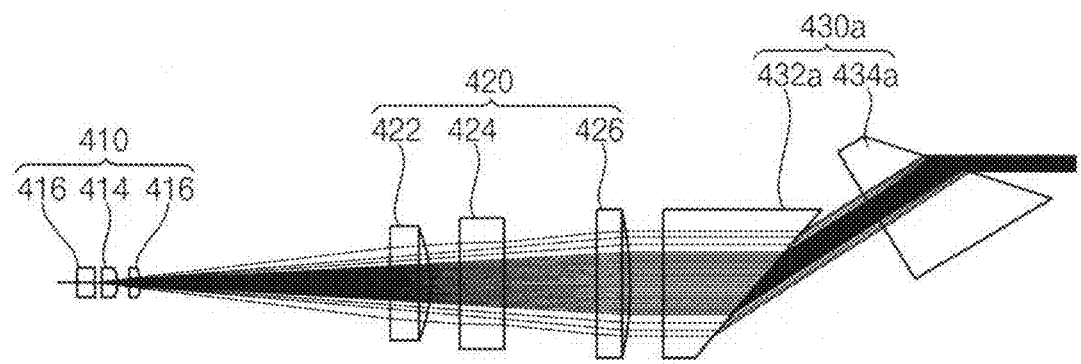
FIG. 22 illustrates a plan view of the beam expander in FIG. 21.

FIG. 21 is a front view illustrating a beam expander in accordance with example embodiments, and FIG. 22 is a plan view illustrating the beam expander in FIG. 21. Referring to FIGS. 21 and 22, a beam expander 400a of this example embodiment may include the first lens unit 410, the second lens unit 420 and a prism unit 430a.

The first lens unit 410 and the second lens unit 420 may be substantially the same as the first lens unit 410 and the second lens unit 420 in FIGS. 18 to 20. Thus, any further illustrations with respect to the first lens unit 410 and the second lens unit 420 may be omitted herein for brevity.

The prism unit 430a may be arranged between the second lens unit 420 and the total internal reflection prism assembly 300. The prism unit 430a may reduce the circular light, which may be increased along the first horizontal direction by the second lens unit 420, along the second and third horizontal directions to form the elliptical light L2. The prism unit 420a may include a first prism 432a and a second prism 434a.

The first prism 432a may be arranged between the second lens unit 420 and the total internal reflection prism assembly 300. The first prism 432a may have an incidence surface and an exit surface. The incidence surface of the first prism 432a may be substantially perpendicular to the first horizontal direction. Thus, the light may pass through, not be refracted from, the incidence surface of the first prism 432a. The exit surface of the first prism 432a may be inclined to the second and third horizontal directions at an acute angle. Thus, the light passing through the incidence surface of the first prism 432a may be refracted from the exit surface of the first prism 432a.

The second prism 434a may be arranged between the first prism 432a and the total internal reflection prism assembly 300. The second prism 434a may have an incidence surface and an exit surface. The incidence surface of the second prism 434a may be substantially perpendicular to a path of the light refracted from the exit surface of the first prism 432a. Thus, the refracted light may pass through, not be refracted from, the incidence surface of the second prism 434a. The exit surface of the second prism 434a may be inclined to the path of the refracted light at an acute angle. Thus, the light passing through the incidence surface of the first prism 432a may be refracted from the exit surface of the second prism 434a. The refracted light may be incident along the first horizontal direction.

The elliptical light L2 formed by the beam expander 400 may be incident on the total internal reflection prism assembly 300. The incidence surfaces 112, 122, 132, 142 and 152 of the total reflection incidence prism unit 100d in the total internal reflection prism assembly 300 may have a size for allowing the elliptical light L2 to be incident on the incidence surfaces 112, 122, 132, 142, and 152. Thus, a summed vertical length of the incidence surfaces 112, 122, 132, 142, and 152 of the total reflection incidence prism unit 100d may be longer than the length of the long axis of the elliptical light L2. Further, a summed horizontal length of the incidence surfaces 112, 122, 132, 142, and 152 of the total reflection incidence prism unit 100d may be longer than the length of the short axis of the elliptical light L2.

However, the shape of the light incident on the total internal reflection prism assembly 300 is not restricted to the elliptical shape. For example, the light may have a circular shape, a symmetric shape with respect to a horizontal or a vertical axis, etc.

The total reflection incidence prism unit 100d may totally reflect the elliptical light L2 to exit the central incidence beam CIB, the first incidence beam IB1, the third incidence beam IB3, the second incidence beam IB2 and the fourth incidence beam IB4 horizontally arranged. The total reflection exit prism unit 200 may totally reflect the central incidence beam CIB, the first incidence beam IB1, the third incidence beam IB3, the second incidence beam IB2 and the fourth incidence beam IB4 to form the central exit beam CEB, the first exit beam EB1, the third exit beam EB3, the second exit beam EB2 and the fourth exit beam EB4. The central exit beam CEB, the first exit beam EB1, the third exit beam EB3, the second exit beam EB2 and the fourth exit beam EB4 may then be incident on the condensing lens unit 500.

Figure 23:
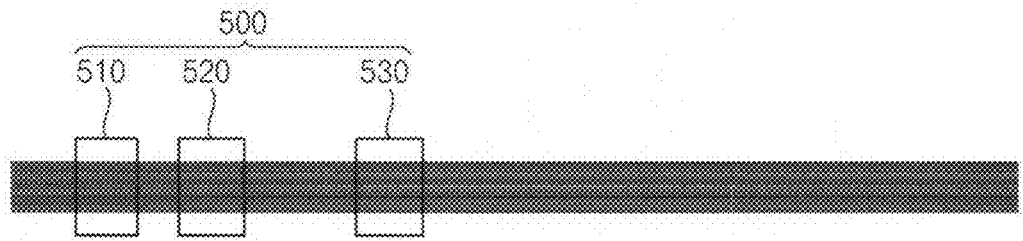
FIG. 23 illustrates a front view of a condensing lens of the apparatus in FIG. 15.
Figure 24:
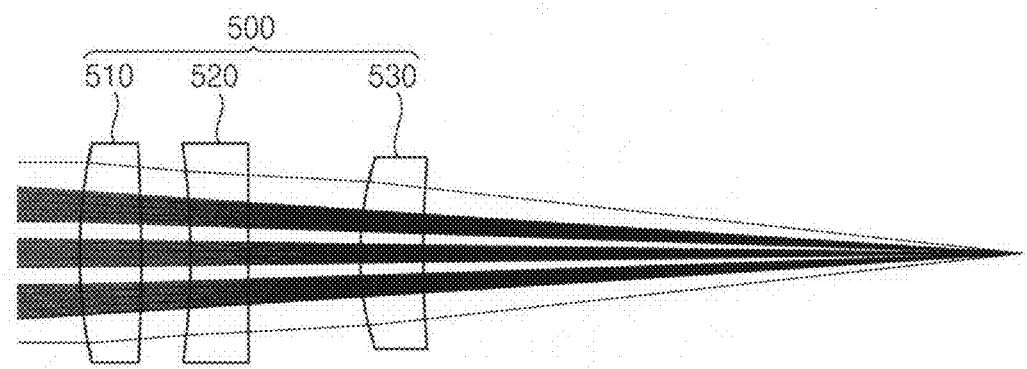
FIG. 24 illustrates a plan view of the condensing lens in FIG. 23.

FIG. 23 is a front view illustrating a condensing lens of the apparatus in FIG. 15, and FIG. 24 is a plan view illustrating the condensing lens in FIG. 23. Referring to FIGS. 23 and 24, the condensing lens unit 500 may include a first convex lens 510, a concave lens 520, and a second convex lens 530.

The first convex lens 510 may primarily condense the central exit beam CEB, the first exit beam EB1, the third exit beam EB3, the second exit beam EB2 and the fourth exit beam EB4 along the second and third horizontal direction. The concave lens 520 may expand the central exit beam CEB, the first exit beam EB1, the third exit beam EB3, the second exit beam EB2, and the fourth exit beam EB4 primarily condensed by the first convex lens 510. The second convex lens 530 may secondarily condense the central exit beam CEB, the first exit beam EB1, the third exit beam EB3, the second exit beam EB2 and the fourth exit beam EB4 expanded by the concave lens 520. Thus, a horizontal gap between the central exit beam CEB and the first exit beam EB1, a horizontal gap between the first exit beam EB1 and the third exit beam EB3, a horizontal gap between the central exit beam CEB and the second exit beam EB2, and a horizontal gap between the second exit beam EB2 and the fourth exit beam EB4 may be reduced to form the line beam.

Figure 25:
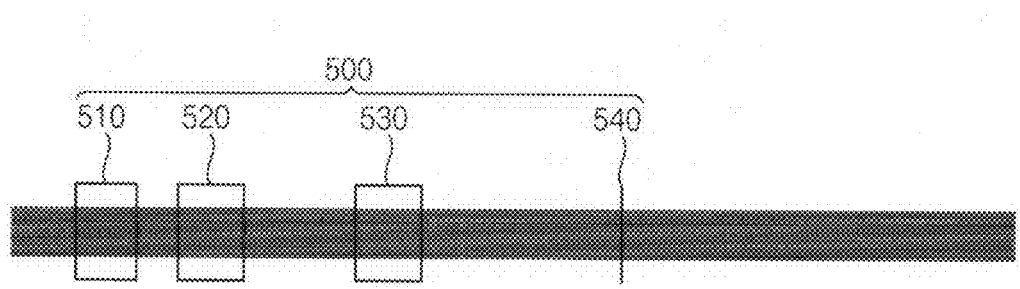
FIG. 25 illustrates a front view of a condensing lens in accordance with example embodiments.
Figure 26:
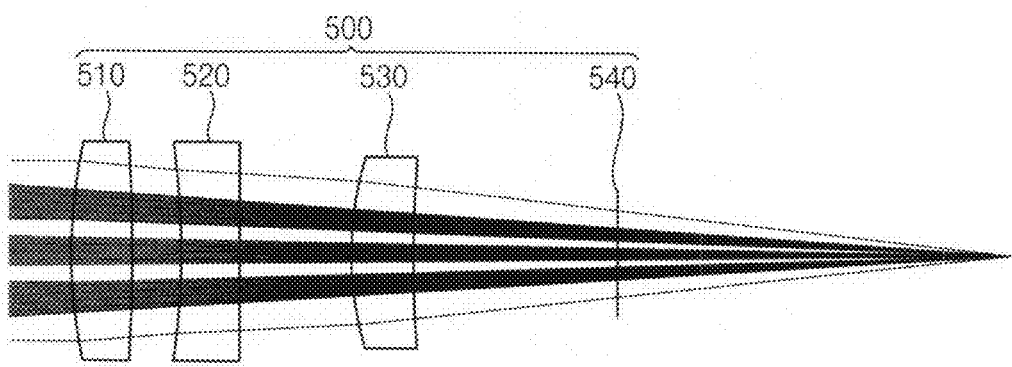
FIG. 26 illustrates a plan view of the condensing lens in FIG. 25.

FIG. 25 is a front view illustrating a condensing lens in accordance with example embodiments, and FIG. 26 is a plan view illustrating the condensing lens in FIG. 25. Referring to FIGS. 25 and 26, the condensing lens unit 500 may further include a cylindrical lens 540. The cylindrical lens 540 may adjust vertical lengths of the central exit beam CEB, the first exit beam EB1, the third exit beam EB3, the second exit beam EB2, and the fourth exit beam EB4 secondarily condensed by the second convex lens 530.

Hereinafter, operations for forming a homogeneous line beam using the apparatus may be illustrated in detail.

Figure 27:
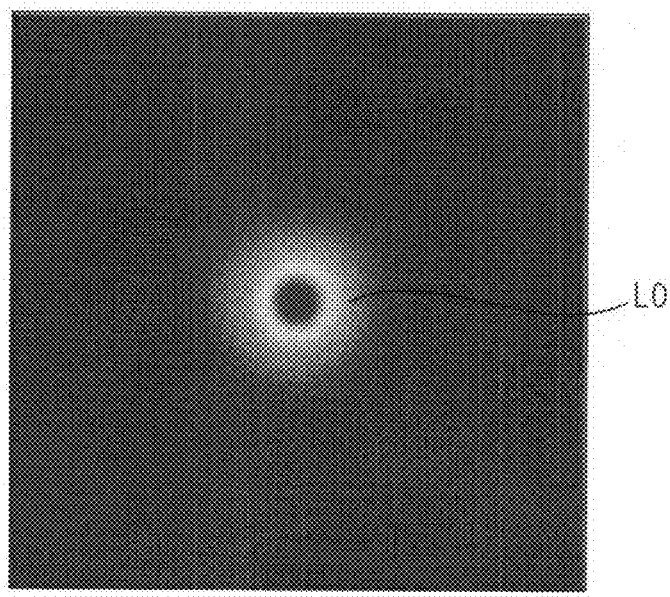
FIG. 27 illustrates a photograph showing a light emitted from a light source.

FIG. 27 is a photograph of light emitted from a light source. As shown in FIG. 27, the light L0 emitted from the light source may have a circular shape having a small diameter.

Figure 28:
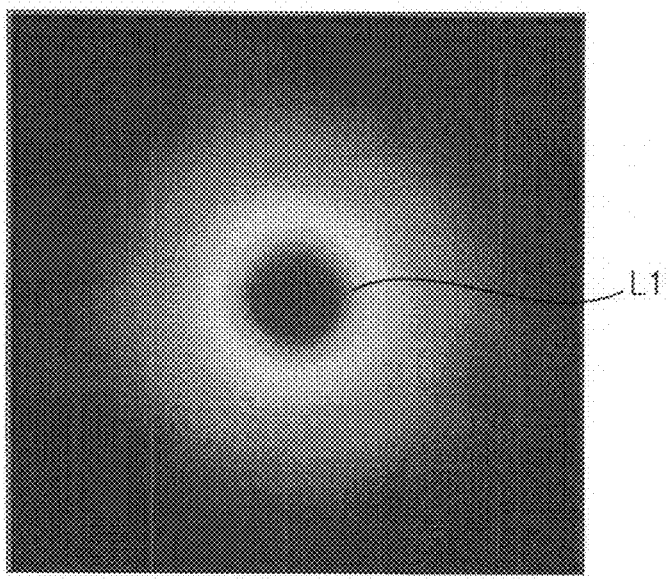
FIG. 28 illustrates a photograph showing a circular light formed by expanding the light in FIG. 27 using the beam expander.

The light L0 may be incident on the beam expander 400 along the first horizontal direction. The first to third concave lenses 412, 414, and 416 of the first lens unit 410 may expand the light L0. e.g., three times, to form the circular light L1 shown in FIG. 28.

The circular light L1 may be incident on the second lens unit 420. The first convex lens 422 of the second lens unit 420 may primarily reduce the circular light L1. The concave lens 424 of the second lens unit 420 may expand the primarily reduced circular light L1. The second convex lens 426 of the second lens unit 420 may secondarily reduce the expanded circular light L1 to increase the expanded circular light L1 along the first horizontal direction.

The circular light L1 increased along the first horizontal direction may be incident on the third lens unit 430. The first convex lens 432 of the third lens unit 430 may primarily reduce the circular light L1 along the second and third horizontal directions to form the preliminary elliptical light. The second convex lens 434 of the third lens unit 430 may secondarily reduce the preliminary elliptical light along the second and third horizontal directions. The concave lens 436 of the third lens unit 430 may expand the preliminary elliptical light to form the elliptical light L2 in FIG. 29.

The elliptical light L2 may be incident on the total reflection incidence prism unit 100d. The elliptical light L2 may pass through the incidence surface 112 and the exit surface 114 of the central incidence prism 110 to exit the central incidence beam CIB from the exit surface 114 of the central incidence prism 110.

The elliptical light L2 incident on the incidence surface 122 of the first incidence prism 120 may be twice totally reflected from the first and second total reflection incidence surfaces 126 and 128 of the first incidence prism 120 to exit the first incidence beam IB1 from the exit surface 124 of the first incidence prism 120.

The elliptical light L2 incident on the incidence surface 142 of the third incidence prism 140 may be twice totally reflected from the fifth and sixth total reflection incidence surfaces 146 and 148 of the third incidence prism 140 to exit the third incidence beam IB3 from the exit surface 144 of the third incidence prism 140.

The elliptical light L2 incident on the incidence surface 132 of the second incidence prism 130 may be twice totally reflected from the third and fourth total reflection incidence surfaces 136 and 138 of the second incidence prism 130 to exit the second incidence beam IB2 from the exit surface 134 of the second incidence prism 130.

The elliptical light L2 incident on the incidence surface 152 of the fourth incidence prism 150 may be twice totally reflected from the seventh and eighth total reflection incidence surfaces 156 and 158 of the fourth incidence prism 150 to exit the fourth incidence beam IB4 from the exit surface 154 of the fourth incidence prism 150.

Figure 29:
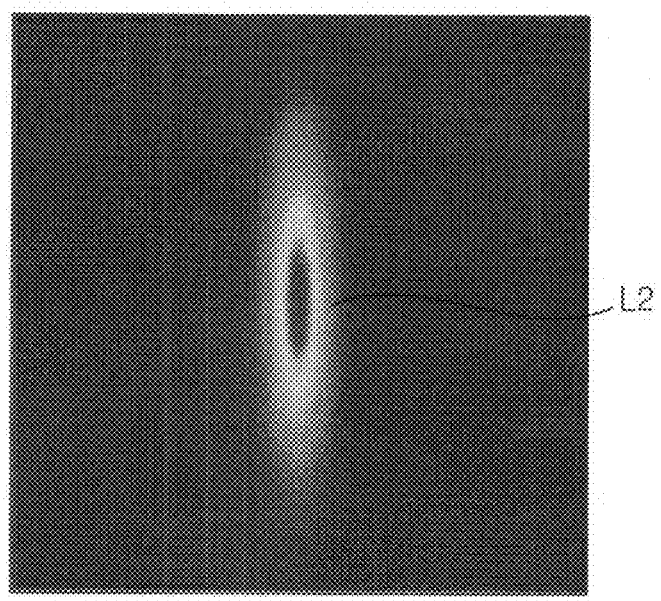
FIG. 29 illustrates a photograph showing an elliptical light formed by expanding the circular light in FIG. 28 using the beam expander.
Figure 30:
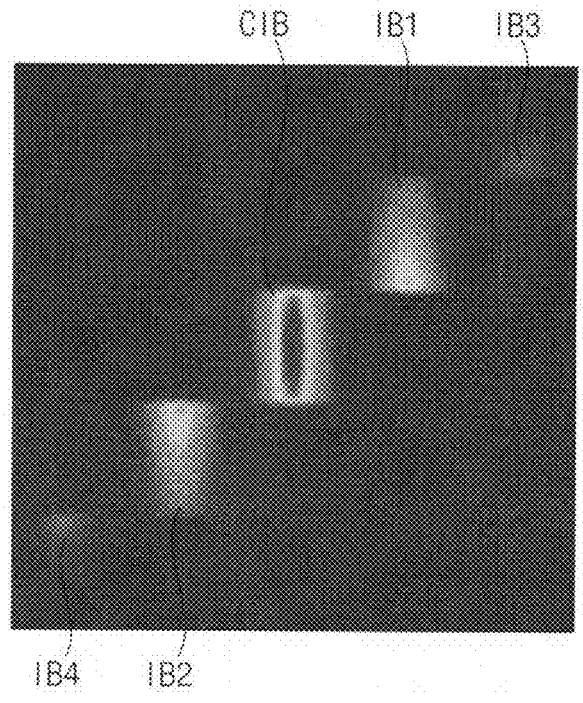
FIG. 30 illustrates a photograph showing a beam formed by redistributing the elliptical light in FIG. 29 using the total reflection incidence prism unit.

FIG. 30 is a photograph showing a beam formed by redistributing the elliptical light in FIG. 29 using the total reflection incidence prism unit. As shown in FIG. 30, the central incidence beam CIB, the first incidence beam IB1, the second incidence beam IB2, the third incidence beam IB3 and the fourth incidence beam IB4 may not be positioned on a same vertical line. Thus, the central incidence beam CIB, the first incidence beam IB1, the second incidence beam IB2, the third incidence beam IB3 and the fourth incidence beam IB4 may not overlap each other on the same vertical line. Further, the central incidence beam CIB, the first incidence beam IB1, the second incidence beam IB2, the third incidence beam IB3 and the fourth incidence beam IB4 may be discrete from each other along the horizontal direction.

The central incidence beam CIB may be incident on the central exit prism 210 of the total reflection exit prism unit 200. The central incidence beam CIB may pass through the incidence surface 212 and the exit surface 214 of the central exit prism 210 to exit the central exit beam CEB from the exit surface 214 of the central exit prism 210.

The first incidence beam IB1 may be incident on the first exit prism 220 of the total reflection exit prism unit 200. The first incidence beam IB1 may be totally reflected two time from the first and second total reflection exit surfaces 226 and 228 of the first exit prism 220 to exit the first exit beam EB1 from the exit surface 224 of the first exit prism 220.

The third incidence beam IB3 may be incident on the third exit prism 240 of the total reflection exit prism unit 200. The third incidence beam IB3 may be totally reflected two time from the fifth and sixth total reflection exit surfaces 246 and 248 of the third exit prism 240 to exit the third exit beam EB3 from the exit surface 244 of the third exit prism 240.

The second incidence beam IB2 may be incident on the second exit prism 230 of the total reflection exit prism unit 200. The second incidence beam IB2 may be totally reflected two time from the third and fourth total reflection exit surfaces 236 and 238 of the second exit prism 230 to exit the second exit beam EB2 from the exit surface 234 of the second exit prism 230.

The fourth incidence beam IB4 may be incident on the fourth exit prism 250 of the total reflection exit prism unit 200. The fourth incidence beam IB4 may be totally reflected two time from the seventh and eighth total reflection exit surfaces 256 and 258 of the fourth exit prism 250 to exit the fourth exit beam EB4 from the exit surface 254 of the fourth exit prism 250.

Figure 31:
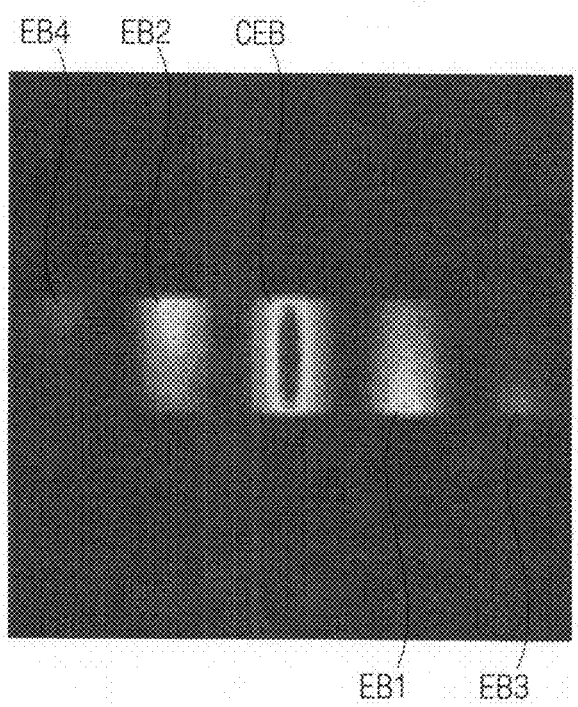
FIG. 31 illustrates a photograph showing a beam formed by horizontally redistributing the beam in FIG. 30 using the total reflection exit prism unit.

FIG. 31 is a photograph showing a beam formed by horizontally redistributing the beam in FIG. 30 using the total reflection exit prism unit. As shown in FIG. 31, the central exit beam CEB, the first exit beam EB1, the second exit beam EB2, the third exit beam EB3 and the fourth exit beam EB4 may be discrete from each other along the horizontal direction.

Figure 32:
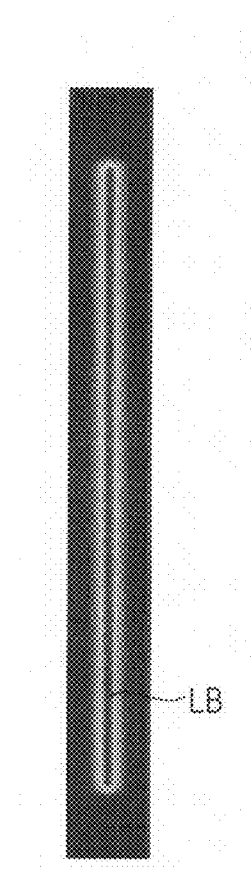
FIG. 32 illustrates a photograph showing a line beam formed by condensing the redistributed beam in FIG. 31 using the condensing lens unit.

The central exit beam CEB, the first exit beam EB1, the second exit beam EB2, the third exit beam EB3 and the fourth exit beam EB4 may be incident on the condensing lens unit 500. The first convex lens 510 of the condensing lens unit 500 may primarily condense the central exit beam CEB, the first exit beam EB1, the second exit beam EB2, the third exit beam EB3 and the fourth exit beam EB4 along the second and third horizontal directions. The concave lens 520 of the condensing lens unit 500 may expand the central exit beam CEB, the first exit beam EB1, the second exit beam EB2, the third exit beam EB3 and the fourth exit beam EB4 primarily condensed by the first convex lens 510. The second convex lens 530 of the condensing lens unit 500 may secondarily condense the central exit beam CEB, the first exit beam EB1, the second exit beam EB2, the third exit beam EB3 and the fourth exit beam EB4 expanded by the concave lens 520. Thus, a horizontal gap between the central exit beam CEB and the first exit beam EB1, a horizontal gap between the first exit beam EB1 and the third exit beam EB3, a horizontal gap between the central exit beam CEB and the second exit beam EB2, a horizontal gap between the second exit beam EB2 and the fourth exit beam EB4 may be reduced to form the line beam LB in FIG. 32.

Although the horizontal gap between the first exit beam EB1 and the third exit beam EB3, the horizontal gap between the central exit beam CEB and the second exit beam EB2, the horizontal gap between the second exit beam EB2 and the fourth exit beam EB4 may be reduced by the condensing lens unit 500, the central exit beam CEB, the first exit beam EB1, the second exit beam EB2, the third exit beam EB3 and the fourth exit beam EB4 may not overlap each other. Therefore, the apparatus may be used with coherent light.

Additionally, the cylindrical lens 540 may increase or decrease the vertical length of the line beam LB.

In example embodiments, the apparatus for forming the line beam may be applied to semiconductor fabrication processes. Particularly, the apparatus may be applied to a process for testing a semiconductor device.

According to example embodiments, the prisms may totally reflect the light to form the discrete beams along the horizontal direction. The prisms may have a readily processed parallelepiped shape to prevent homogeneity of the line beam from being reduced due to process failures. Further, the homogeneity of the line beam may be readily controlled by adjusting stacking numbers of the prisms. Furthermore, because the horizontally discrete beams may be condensed to form the line beam, a coherent light may be used. Moreover, the prism unit may use the total reflection, not refraction or transmission, so that the homogeneous line beam may be formed from the light having various wavelengths. Therefore, the homogeneous line beam may be formed from broadband light.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A total internal reflection prism unit, comprising:
   a first prism having a first total reflection surface and a second total reflection surface, the first total reflection surface to totally reflect light incident in a first horizontal direction, along a second horizontal direction substantially perpendicular to the first horizontal direction, and the second total reflection surface to totally reflect the totally reflected light from the first total reflection surface along the first horizontal direction to form a first beam; and
   a second prism including a third total reflection surface and a fourth total reflection surface, the third total reflection surface to totally reflect the light, which is incident in the first horizontal direction, along a third horizontal direction substantially perpendicular to the first horizontal direction, and the fourth total reflection surface to totally reflect the totally reflected light from the third total reflection surface along the first horizontal direction to form a second beam discrete from the first beam along the third horizontal direction,
   wherein the first prism is arranged over the second prism along a vertical direction perpendicular to the first through third directions.

2. The total internal reflection prism unit as claimed in claim 1, wherein a portion of a bottom surface of the first prism overlaps a portion of a top surface of the second prism along the vertical direction, as viewed in a top view.

3. The total internal reflection prism unit as claimed in claim 1, wherein the second horizontal direction is opposite to the third horizontal direction.

4. The total internal reflection prism unit as claimed in claim 3, wherein the first prism has a parallelepiped shape, the first and second total reflection surfaces correspond to opposite two side surfaces of the first prism, and the first and second total reflection surfaces are inclined to the first horizontal direction at a critical angle at which the light is totally reflected with respect to the first horizontal direction.

5. The total internal reflection prism unit as claimed in claim 3, wherein the second prism has a parallelepiped shape, the third and fourth total reflection surfaces correspond to opposite two side surfaces of the second prism, and the third and fourth total reflection surfaces are inclined to the first horizontal direction at a critical angle at which light is totally reflected with respect to the first horizontal direction.

6. The total internal reflection prism unit as claimed in claim 5, wherein the first prism has a parallelepiped shape substantially the same as the parallelepiped shape of the second prism, a first short side of the first prism and a first short side of the second prism being aligned with each other and completely overlapping each other along the vertical direction, and the first and second prisms extending in different directions.

7. The total internal reflection prism unit as claimed in claim 3, further comprising a central prism arranged between the first prism and the second prism to form a central beam from the light, the first prism, the central prism, and the second prism being stacked on top of each other along the vertical direction.

8. The total internal reflection prism unit as claimed in claim 7, wherein the first prism makes contact with an upper surface of the central prism, and the second prism makes contact with a lower surface of the central prism, the first and second prisms overlapping different portions of the central prism.

9. The total internal reflection prism unit as claimed in claim 3, further comprising:
   a third prism arranged over the first prism, the third prism including a fifth total reflection surface and a sixth total reflection surface, the fifth total reflection surface arranged substantially parallel to the first total reflection surface to totally reflect the light, which is incident in the first horizontal direction, along the second horizontal direction, and the sixth total reflection surface arranged substantially parallel to the second total reflection surface to totally reflect the totally reflected light from the fifth total reflection surface along the first horizontal direction to form a third beam discrete from the first beam along the second horizontal direction; and
   a fourth prism arranged under the second prism, the fourth prism including a seventh total reflection surface and an eighth total reflection surface, the seventh total reflection surface arranged substantially parallel to the third total reflection surface to totally reflect the light, which is incident in the first horizontal direction, along the third horizontal direction, and the eighth total reflection surface arranged substantially parallel to the fourth total reflection surface to totally reflect the totally reflected light from the seventh total reflection surface along the first horizontal direction to form a fourth beam discrete from the second beam along the third horizontal direction.

10. The total internal reflection prism unit as claimed in claim 9, wherein the third prism has a parallelepiped shape having a size larger than that of the first prism, and the fifth and sixth total reflection surfaces correspond to opposite two side surfaces of the third prism, and the fifth and sixth total reflection surfaces are inclined to the first horizontal direction at a critical angle at which the light is totally reflected with respect to the first horizontal direction.

11. The total internal reflection prism unit as claimed in claim 9, wherein the third prism has a parallelepiped shape having a size smaller than that of the first prism, and the fifth and sixth total reflection surfaces correspond to opposite two side surfaces of the third prism, and the fifth and sixth total reflection surfaces are inclined to the first horizontal direction at a critical angle at which the light is totally reflected with respect to the first horizontal direction.

12. The total internal reflection prism unit as claimed in claim 9, wherein the fourth prism has a parallelepiped shape having a size larger than that of the second prism, and the seventh and eighth total reflection surfaces correspond to opposite two side surfaces of the fourth prism, and the seventh and eighth total reflection surfaces are inclined to the first horizontal direction at a critical angle at which the light is totally reflected with respect to the first horizontal direction.

13. The total internal reflection prism unit as claimed in claim 9, wherein the fourth prism has a parallelepiped shape having a size smaller than that of the second prism, and the seventh and eighth total reflection surfaces correspond to opposite two side surfaces of the fourth prism, and the seventh and eighth total reflection surfaces are inclined to the first horizontal direction at a critical angle at which the light is totally reflected with respect to the first horizontal direction.

14. The total internal reflection prism unit as claimed in claim 9, wherein the first prism, the second prism, the third prism and the fourth prism have substantially the same thickness along the vertical direction.

15. The total internal reflection prism unit as claimed in claim 9, wherein the third prism has a parallelepiped shape substantially the same as that of the fourth prism.

16. The total internal reflection prism unit as claimed in claim 9, wherein the third prism makes contact with an upper surface of the first prism, and the fourth prism makes contact with a lower surface of the second prism.

17. The total internal reflection prism unit as claimed in claim 1, wherein the second and third horizontal directions are parallel.

18. The total internal reflection prism unit as claimed in claim 17, wherein the first prism has a parallelepiped shape, the first and second total reflection surfaces correspond to opposite two side surfaces of the first prism, and the first and second total reflection surfaces are inclined to the first horizontal direction at a critical angle at which the light is totally reflected with respect to the first horizontal direction, and
   wherein the second prism has a parallelepiped shape having a size different from that of the first prism, the fourth total reflection surface is discrete from the second total reflection surface, and the third and fourth total reflection surfaces are inclined to the first horizontal direction at the critical angle.

19. A total internal reflection prism assembly, comprising:
   a total reflection incidence prism unit including a first incidence prism and a second incidence prism, the first and second incidence prisms being arranged on top of each other along a vertical direction,
   the first incidence prism including
      a first total reflection incidence surface and a second total reflection incidence surface, the first total reflection incidence surface to totally reflect a light, which is incident in a first horizontal direction, along a second horizontal direction substantially perpendicular to the first horizontal direction, the second total reflection incidence surface to totally reflect the totally reflected light from the first total reflection incidence surface along the first horizontal direction to form a first incidence beam, and the second incidence prism including
      a third total reflection incidence surface and a fourth total reflection incidence surface, the third total reflection incidence surface to totally reflect the light, which is incident in the first horizontal direction, along a third horizontal direction substantially perpendicular to the first horizontal direction, and the fourth total reflection incidence surface to totally reflect the totally reflected light from the third total reflection incidence surface along the first horizontal direction to form a second incidence beam discrete from the first incidence beam along the third horizontal direction; and
   a total reflection exit prism unit including a first exit prism and a second exit prism, the first exit prism including
      a first total reflection exit surface and a second total reflection exit surface, the first total reflection exit surface to totally reflect the first incidence beam along a first vertical direction, the second total reflection exit surface to totally reflect the totally reflected beam from the first total reflection exit surface along the first horizontal direction to form a first exit beam, and
   the second exit prism including a third total reflection exit surface and a fourth total reflection exit surface, the third total reflection exit surface to totally reflect the second incidence beam along a second vertical direction, and the fourth total reflection exit surface to totally reflect the totally reflected beam from the third total reflection exit surface along the first horizontal direction to form a second exit beam discrete from the first exit beam along the third horizontal direction.

20. An apparatus for forming a line beam, the apparatus comprising:
   a total reflection incidence prism unit including a first incidence prism and a second incidence prism, the first and second incidence prisms being arranged on top of each other along a vertical direction,
      the first incidence prism including a first total reflection incidence surface and a second total reflection incidence surface, the first total reflection incidence surface to totally reflect a light, which is incident in a first horizontal direction, along a second horizontal direction substantially perpendicular to the first horizontal direction, the second total reflection incidence surface to totally reflect the totally reflected light from the first total reflection incidence surface along the first horizontal direction to form a first incidence beam, and
      the second incidence prism including a third total reflection incidence surface and a fourth total reflection incidence surface, the third total reflection incidence surface to totally reflect the light, which is incident in the first horizontal direction, along a third horizontal direction substantially perpendicular to the first horizontal direction, and the fourth total reflection incidence surface to totally reflect the totally reflected light from the third total reflection incidence surface along the first horizontal direction to form a second incidence beam discrete from the first incidence beam along the third horizontal direction;
   a total reflection exit prism unit including a first exit prism and a second exit prism,
      the first exit prism including a first total reflection exit surface and a second total reflection exit surface, the first total reflection exit surface to totally reflect the first incidence beam along a first vertical direction, the second total reflection exit surface to totally reflect the totally reflected beam from the first total reflection exit surface along the first horizontal direction to form a first exit beam, and
      the second exit prism including a third total reflection exit surface and a fourth total reflection exit surface, the third total reflection exit surface to totally reflect the second incidence beam along a second vertical direction, and the fourth total reflection exit surface to totally reflect the totally reflected beam from the third total reflection exit surface along the first horizontal direction to form a second exit beam discrete from the first exit beam along the third horizontal direction; and
   a condensing lens unit to condense the first and second exit beams exiting from the total reflection exit prism unit along the second and third horizontal directions to form the line beam.

* * * * *